United States Patent
Chen et al.

(10) Patent No.: US 7,748,782 B2
(45) Date of Patent: Jul. 6, 2010

(54) TILT ADJUSTMENT MECHANISM FOR CHILD SAFETY SEAT

(75) Inventors: Shun-Min Chen, Taipei (TW); Jianqun Li, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 686 days.

(21) Appl. No.: 11/518,285

(22) Filed: Sep. 11, 2006

(65) Prior Publication Data

US 2007/0057546 A1    Mar. 15, 2007

(30) Foreign Application Priority Data

Sep. 14, 2005  (CN) .................. 2005 2 0105296 U
Mar. 9, 2006   (CN) .................. 2006 2 0004978 U
Jun. 7, 2006   (CN) .................. 2006 2 0114861 U

(51) Int. Cl.
    *A47C 1/08*    (2006.01)
(52) U.S. Cl. .................. 297/256.13; 297/256.11; 297/256.1
(58) Field of Classification Search ............. 297/256.1, 297/256.11, 256.13, 250.1, 328, 327, 423.46, 297/423.44, 423.45, 461, 462, 463.1, 344.1
    See application file for complete search history.

(56) References Cited

U.S. PATENT DOCUMENTS

| | | | |
|---|---|---|---|
| 4,733,909 A * | 3/1988 | Single et al. ........... | 297/256.13 |
| 5,335,964 A * | 8/1994 | Sedlack et al. ......... | 297/256.13 |
| 5,609,393 A * | 3/1997 | Meeker et al. ......... | 297/256.13 |
| 5,836,650 A * | 11/1998 | Warner et al. .......... | 297/256.11 |
| 6,017,088 A * | 1/2000 | Stephens et al. ....... | 297/256.16 |
| 6,299,249 B1 * | 10/2001 | Mori ...................... | 297/256.13 |
| 6,318,799 B1 * | 11/2001 | Greger et al. .......... | 297/256.13 |
| 6,428,099 B1 * | 8/2002 | Kain ........................ | 297/256.1 |
| 6,554,358 B2 * | 4/2003 | Kain ...................... | 297/256.13 |
| 6,705,675 B1 * | 3/2004 | Eastman et al. ......... | 297/250.1 |
| 6,834,915 B2 * | 12/2004 | Sedlack .................. | 297/256.13 |
| 7,059,677 B2 * | 6/2006 | Balensiefer et al. .... | 297/256.13 |
| 7,207,628 B2 * | 4/2007 | Eros ........................... | 297/297 |
| 7,246,852 B2 * | 7/2007 | Balensiefer .............. | 297/250.1 |

* cited by examiner

*Primary Examiner*—Laurie K Cranmer
(74) *Attorney, Agent, or Firm*—Bacon & Thomas, PLLC

(57) ABSTRACT

In accordance with one embodiment, tilt adjustment mechanism mounted on a child safety seat is provided, the tilt adjustment mechanism including: a seat portion having a recess; and a support block pivotally connected to the seat portion having a first protruding portion, the support block being rotated relative to the seat portion between a first position at which the recess of the seat portion is engaged with the first protruding portion of the support block and a second position at which the recess of the seat portion is disengaged from the first protruding portion of the support block for varying an angle between the seat portion and the support block.

16 Claims, 28 Drawing Sheets

TILT ADJUSTMENT MECHANISM FOR CHILD SAFETY SEAT

BACKGROUND OF THE INVENTION

1. Field of the Invention

The present invention relates generally to a child safety seat, and more particularly to a child safety seat having a tilt adjustment mechanism for adjusting tilt angle of the child safety seat.

2. Art Background

In general, a child safety seat disposed in a vehicle is mainly utilized to be sat by children and provide a suitable protection for children, and the child safety seat is usually designed angle-adjustable so as to provide a comfortable position for children. As shown in FIG. 1, U.S. Pat. No. 5,746,478 discloses a child safety seat 9, wherein the child safety seat 9 includes a supporting base 91 disposed in a car seat (not shown) and a seat portion 92 rotationally disposed on the supporting base 91. In addition, the child safety seat 9 further includes a pair of racks 93, a pair of guiding tracks 94 formed on the supporting base 91 and a handle 95 disposed between the supporting base 91 and the seat portion 92, wherein the pair of racks 93 further includes a plurality of locking apertures 930. The handle 95 includes a guide bar 951 fixedly connected to the seat portion 92 and slidably disposed on the guiding tracks 94, a pair of latch elements 952 disposed on the guide bar 951 and optionally hooked on the plurality of locking apertures 930, and a pair of pull rods 953 pivotally connected to the latch elements 952 and moved with respect to the seat portion 92. The above-mentioned child safety seat 9 may achieve the purpose and features for adjusting an angle of the seat portion by using the linking lever principle and engaging the latch elements 952 with different locking apertures 930 through the pull rods 953.

However, the above-mentioned prior art is mechanically complex, increases the number of parts on the child safety seat, and therefore increases cost and creates some problems and shortcomings on its operation and reliability. In order to overcome the problems described above, a tilt adjustment mechanism for a child safety seat according to embodiments of the present invention is provided such that the tilt adjustment mechanism includes the purposes and functions of simple structure, low cost, easy operation, and firm engagement, in addition to the basic functions of adjusting a comfortable position for children.

SUMMARY OF THE INVENTION

Accordingly, one object of the present invention is to provide a tilt adjustment mechanism for a child safety seat that is utilized to adjust tilt angle of the child safety seat and a comfortable position for children.

One object of the present invention is to provide a tilt adjustment mechanism that has a simple construction and achieve the purpose of adjusting tilt by rotating a support block relative to a seat portion.

A further object of the present invention is to provide a tilt adjustment mechanism for a child safety seat that is of easy operation.

To achieve these and other objects, a tilt adjustment mechanism mounted on a child safety seat is provided, the tilt adjustment mechanism including: a seat portion having a recess; and a support block pivotally connected to the seat portion having a first protruding portion, the support block being rotated relative to the seat portion between a first position at which the recess of the seat portion is engaged with the first protruding portion of the support block and a second position at which the recess of the seat portion is disengaged from the first protruding portion of the support block for varying an angle between the seat portion and the support block.

It is preferred that the support block further has a second protruding portion and the recess of the seat portion is selectively engaged with the first portion and the second portion so as to lock the support bock respectively at the first position and the second position.

It is preferred that the tilt adjustment mechanism further including a button to be disposed within the recess and abutted against the first protruding portion while the support block is in the first position.

It is preferred that the support block includes a plate-like portion that is elastic, and the first protruding portion is formed on the plate-like portion.

It is preferred that the support block includes a plate-like portion that is elastic, and the first protruding portion is formed on the plate-like portion, the button is pressed against the first protruding portion while the support block is in the first position to remove the first protruding portion of the support block from the recess of the seat portion so as to rotate the support block relative the second position.

It is preferred that the button includes a column portion to be contacted with the first protruding portion when the support block is in the first position.

It is preferred that the seat portion includes an upper-seat portion and a lower-seat portion fastened under the upper-seat portion, and the support block is pivotally connected to the lower-seat portion and the recess is disposed on the upper-seat portion.

It is preferred that the lower-seat portion includes two holes and the support block includes two pivot mounts, the support block is pivotally connected to the lower-seat portion by engaging the holes with the pivot mounts, and the support block may rotate around the engaging position of the support block and the lower-seat portion.

It is preferred that the support block includes a flange in the front end to prevent the support block from fully entering inside the seat portion and facilitate a user to pull at the support block.

It is preferred that the support block includes a retaining piece so as to interfere with the seat portion when the support block is in the first position.

It is preferred that the support block is in a form of sector section from a cross-sectional view and includes a top portion and a bottom portion, and one end of the plate-like portion is integrally connected to the top portion and two sides and another end of the plate-like portion are separated from the top portion and formed two elongated slots.

It is preferred that the support block includes a wall portion been integrally connected between the top portion and the bottom portion, the wall portion having a first wall and a second wall substantially parallel to the first wall, the first wall and second wall including a nib respectively for interfering with the seat portion when the support block is in the second position.

It is preferred that the protruding portion of the support block is hook-shaped.

It is preferred that the tilt adjustment mechanism further including a button mounted on the seat portion, and the button includes a column portion to pass through a hole of the seat portion so as to press against the plate-like portion while the support block is in the first position so that the first protruding of the support block removing from the recess of the seat portion and the support block capable rotate to the second position.

Besides, a tilt adjustment mechanism mounted on a child safety seat is provided, the tilt adjustment mechanism including: a seat portion having a plurality of through grooves; and a support block pivotally connected to the seat portion having a plurality of engaging wedge corresponding to the plurality of through grooves, the support block being rotated relative to the seat portion between a first position at which the support block is substantially parallel to the seat portion and a second position at which the engaging wedges of the support block is engaged with the through grooves of the seat portion respectively and there is an angle between the support block and the seat portion.

It is preferred that the tilt adjustment mechanism includes a button and the seat portion includes an opening to receive the button to move within and the button is pressed against the support block to disengage the engaging wedges from the through grooves.

It is preferred that the seat portion includes a button cover having the opening to contain the button, a bottom which is defined the bottom wall of the opening and an aperture which is formed on the bottom, the button includes a column portion to pass through to the aperture so as to press against the support block.

It is preferred that the support block includes a plate-like portion that is elastic, and the engaging wedges are formed on the plate-like portion.

It is preferred that the support block includes a plate-like portion that is elastic, and the engaging wedges are formed on the plate-like portion, the button is pressed against the plate-like portion to disengage the engaging wedge of the support block from the through groove of the seat portion.

It is preferred that the seat portion includes an upper-seat portion and a lower-seat portion fastened under the upper-seat portion, the lower-seat portion includes a vent for allowing the support block to pivotally locate therein, and the through grooves are disposed on the upper-seat portion.

It is to be understood that both the forgoing general description and the following detailed description are exemplary and explanatory and are intended to provide a further non-limiting explanation of the invention as claimed.

BRIEF DESCRIPTION OF THE DRAWINGS

For a more complete understanding of the present invention and the advantages thereof, reference is now made to the following description taken in conjunction with the accompanying drawings, wherein:

FIGS. 17A~19A are cross-sectional views along with line A-A shown in the FIG. 16 illustrating the operation states of the tilt adjustment mechanism; and FIGS. 17B~19B are cross-sectional views along with line B-B shown in the FIG. 16 illustrating the operation states of the tilt adjustment mechanism.

DETAILED DESCRIPTION

Figure 1:
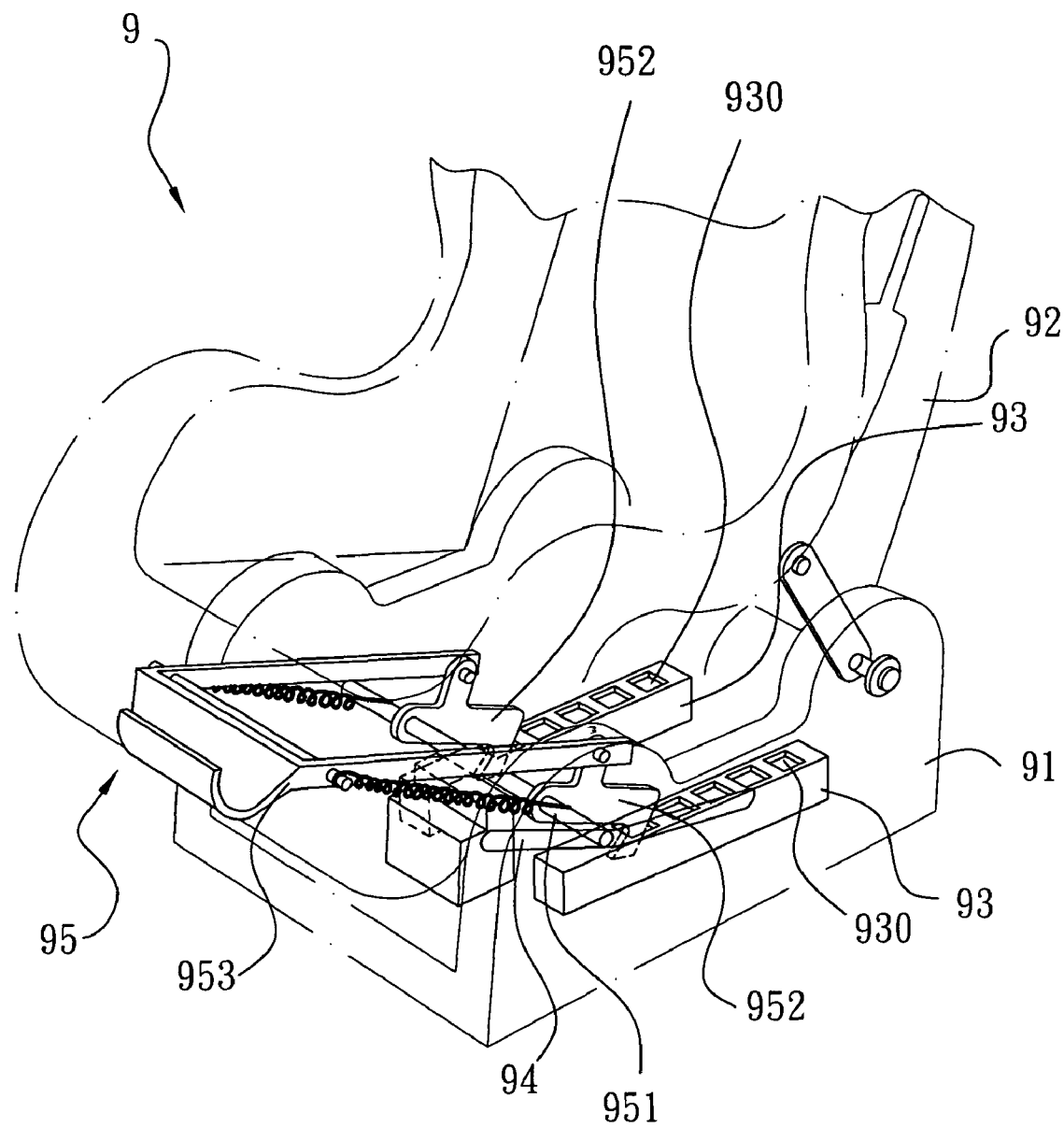
FIG. 1 is a schematic view illustrating a conventional tilt adjustment mechanism for a child safety seat.

Referring now to the drawings in which some preferred embodiments of the present invention are illustrated to describe the present invention.

First Embodiment

Figure 2:
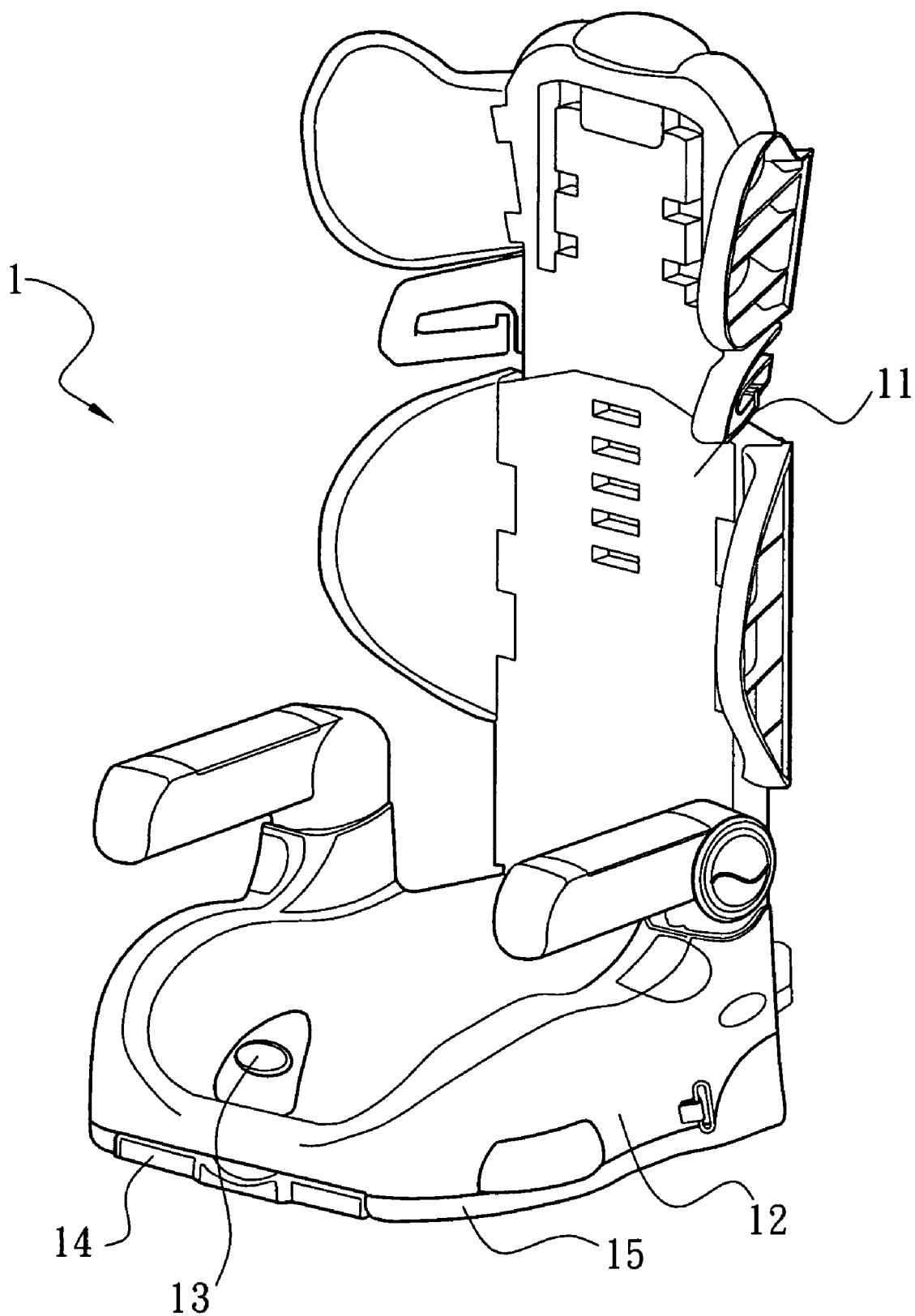
FIG. 2 is a schematic view illustrating the entire appearance of a child safety seat with the tilt adjustment mechanism according to the first embodiment of the present invention.

As shown in FIG. 2, the first embodiment of a tilt adjustment mechanism according to the present invention is mounted on a child safety seat 1. The child safety seat 1 includes a backrest portion 11 to allow the back of children lean thereon and a seat portion connected to the backrest portion 11 at an angle to allow children sit thereon, and the angle between the backrest portion 11 and the seat portion is designed based on ergonomics and the related arts. The tilt adjustment mechanism is provided on the seat portion and includes an upper-seat portion 12, a lower-seat portion 15 disposed below the upper-seat portion 12, a button 13 mounted on the upper-seat portion 12 and a support block 14 disposed below the front of the upper-seat portion 12, wherein the button 13 includes a column portion 131 to be coupled to the upper-seat portion 12.

Figure 5A:
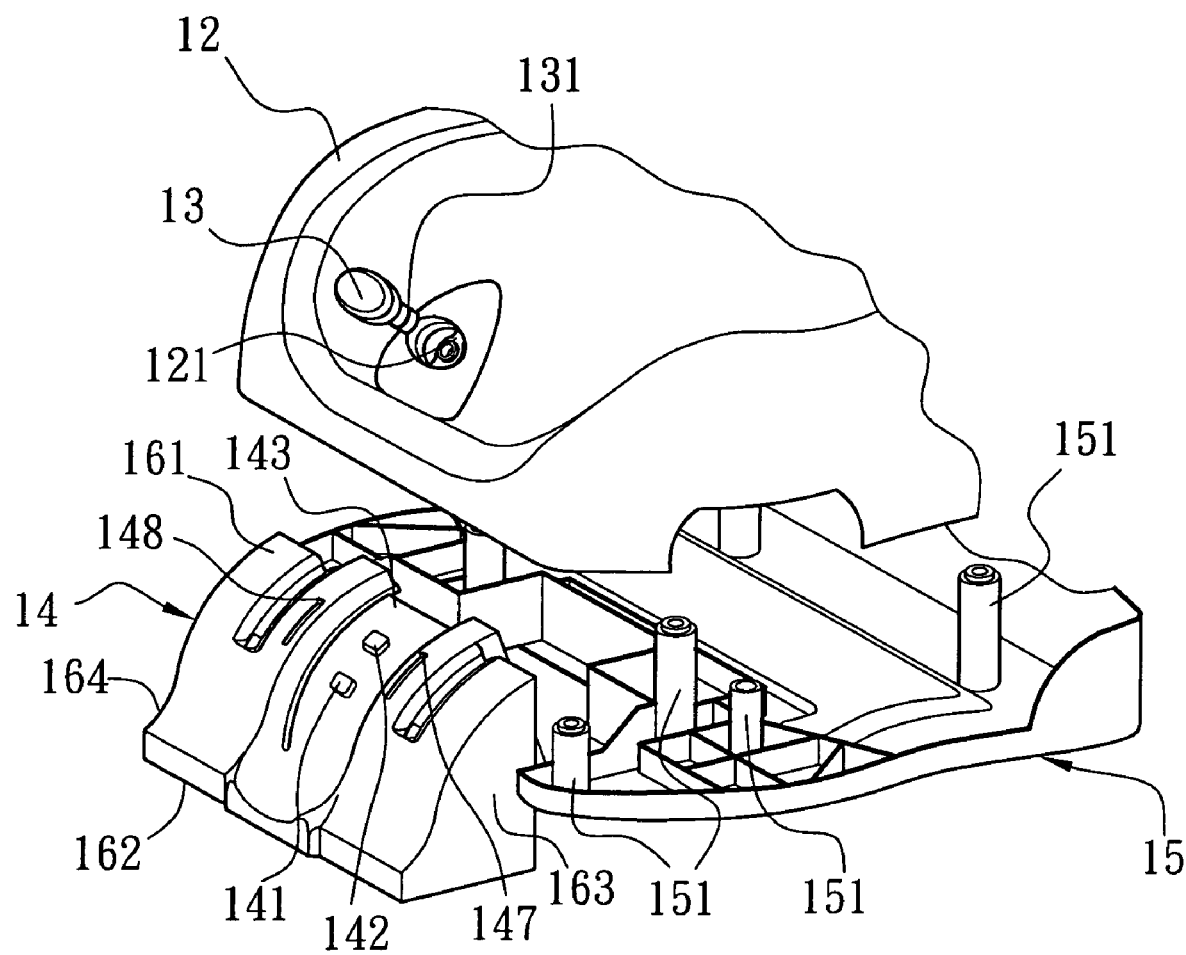
FIGS. 5A and 5B are schematic views illustrating the members of the child safety seat with the tilt adjustment mechanism according to the first embodiment of the present invention in details.
Figure 5B:
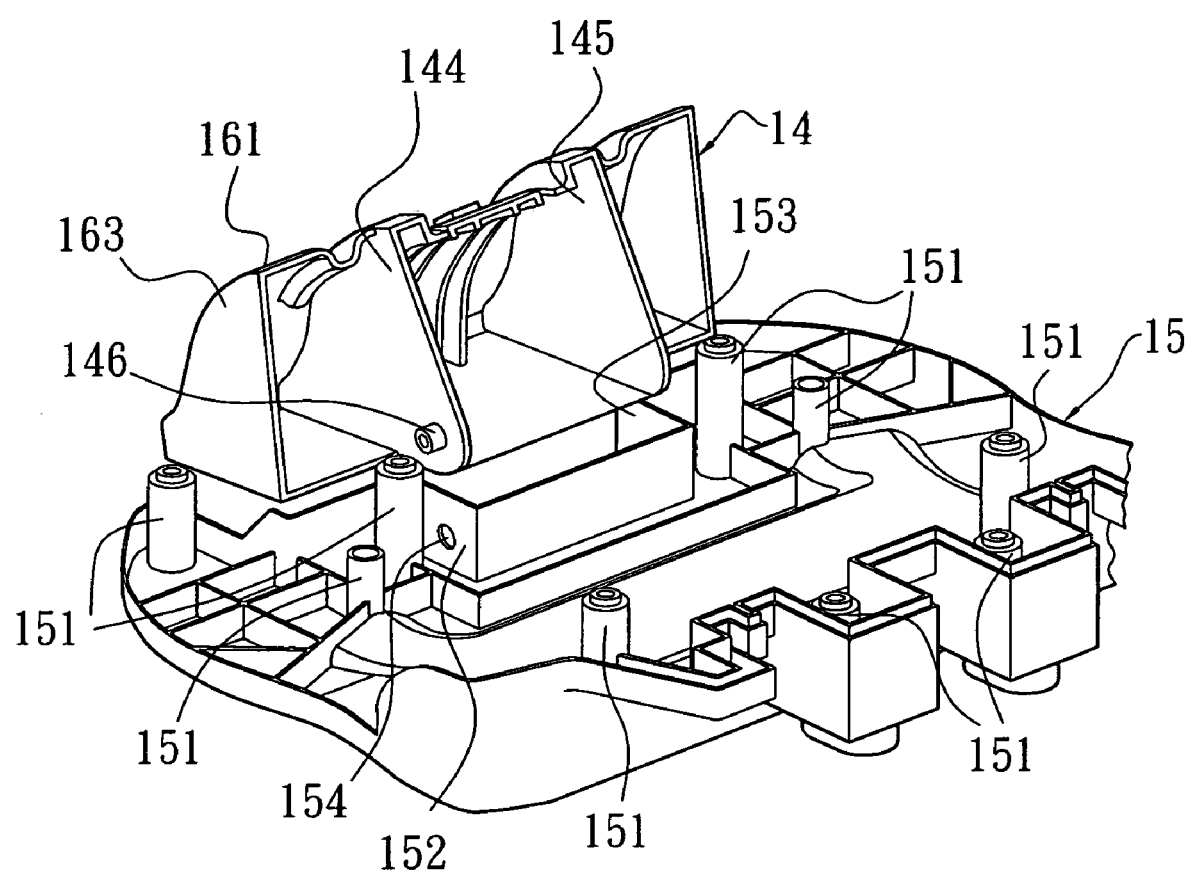
Figure 6A:
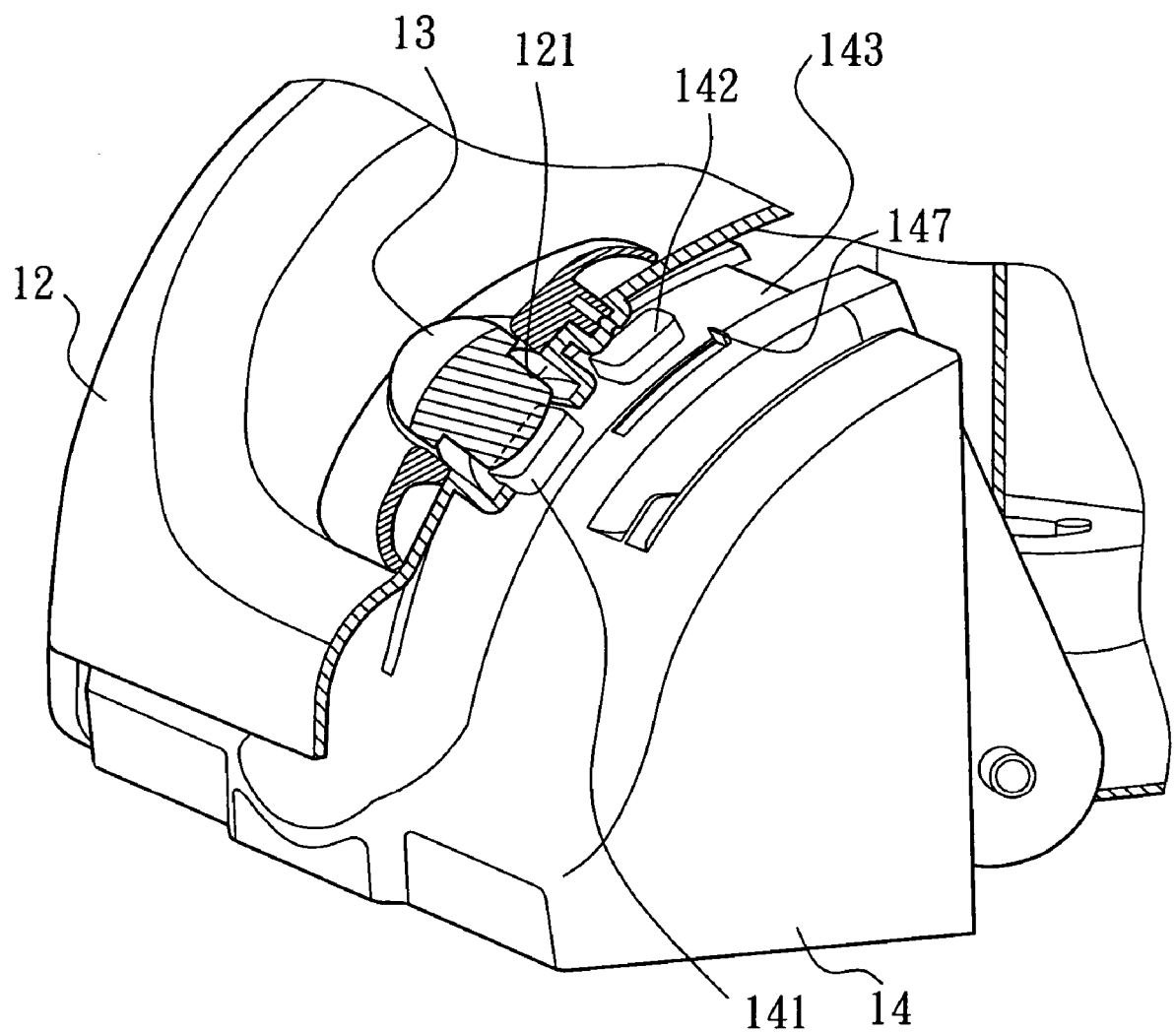
FIGS. 6A and 6B are perspective views illustrating the child safety seat with the tilt adjustment mechanism according to the first embodiment of the present invention after and before adjusting.
Figure 6B:
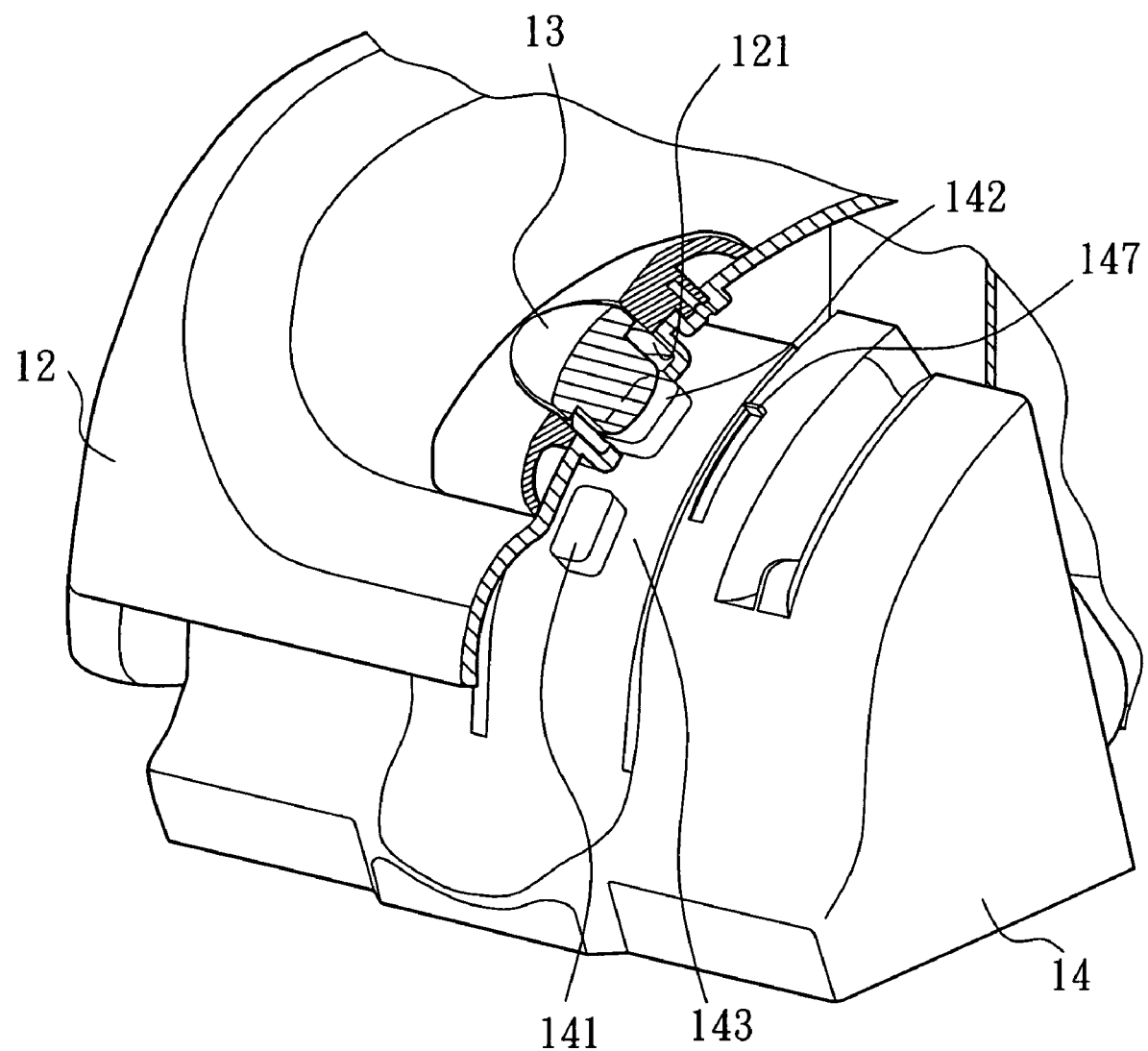

As shown in FIGS. 5A and 5B, the section of the support block 14 is substantially in a form of sector from a cross-sectional view, and the support block 14 mainly includes a bottom portion 162, a wall portion 163 and a top portion 161 which is at an angle connected to the bottom portion 162, and the wall portion 163 is integrally connected between the bottom portion 162 and the top portion 161, wherein the support block 14 includes a first retaining piece 147 and a second retaining piece 148 disposed on the top portion 161, a plate-like portion 143 that is elastic-deformed, and a first protruding portion 142 and a second protruding portion 141 formed on the plate-like portion 143, and the first retaining piece 147 and the second retaining piece 148 are disposed at two sides of the plate-like portion 143 and are hook-shaped shown in FIGS. 6A and 6B. As shown in FIG. 5B, the wall portion 163 includes a first wall 144 and a second wall 145 substantially parallel to the first wall 144 and each wall has a pivot mount 146 respectively while only a pivot mount 146 is shown in FIG. 5B since it is restricted to angle of view, and each of the two pivot mounts 146 is respectively disposed at the rear end of the first wall 144 and the second wall 145 where each pivot mount 146 is pivotally connected to lower-seat portion 15.

The upper-seat portion 12 includes a recess 121 for being received within the button 13. The lower-seat portion 15 includes a top surface, a bottom surface, a first side surface 152 and a second side surface 153 perpendicularly extended from the top surface and two holes 154 while only a hole 154 is shown in FIG. 5B, wherein the first side surface 152 and the second side surface 153 are disposed on the lower-seat portion 15 corresponding to the pivot mount 146 of the support block 14, each of two holes 154 is respectively disposed on the first side surface 152 and the second side surface 153, and a plurality of rods 151 are disposed on the top surface and the rods 151 may be cylindrical or other shaped rods. The plurality of rods 151 of the lower-seat portion 15 are fixed to the upper-seat portion 12 by a fastening device, such as a rivet and a bolt.

A flange 164 is formed in a joint portion of the top portion 161 and the bottom portion 162 of the support block 14 to prevent the support block 14 from fully entering inside the seat portion and facilitate a user to pull at the support block 14 so as to adjust an angle between the support block 14 and the seat portion. The protruding portions 141 and 142 are utilized for being engaged with the recess 121, and the first retaining piece 147 and the second retaining piece 148 are utilized to prevent removal of the support block 14 from the upper-seat portion 12. The plate-like portion 143 is elastic-deformed since one end of the plate-like portion 143 is integrally connected to the top portion 161 and two sides and another end of the plate-like portion 143 are separated from the top portion 161 and formed two elongated slots or free endings. Further, the recess 121 is utilized to allow the column portion 131 of the button 13 pass therethrough and to be engaged with the first protruding portion 142 or the second protruding portion 141. The button 13 is utilized to actuate an angle adjustment of the upper-seat portion 12, and includes a positioning mechanism to connect to the upper-seat portion 12 so as to prevent the button 13 being away from the upper-seat portion 12.

Next, the assembling appearance of the tilt adjustment mechanism will be set forth. The support block 14 is connected to the lower-seat portion 15 by coupling the pivot mount 146 with the holes 154 of the lower-seat portion 15 such that the support block 14 is pivoted relative to the seat portion, while the lower-seat portion 15 is combined with the upper-seat portion 12 by the plurality of rods 151.

Figure 3A:
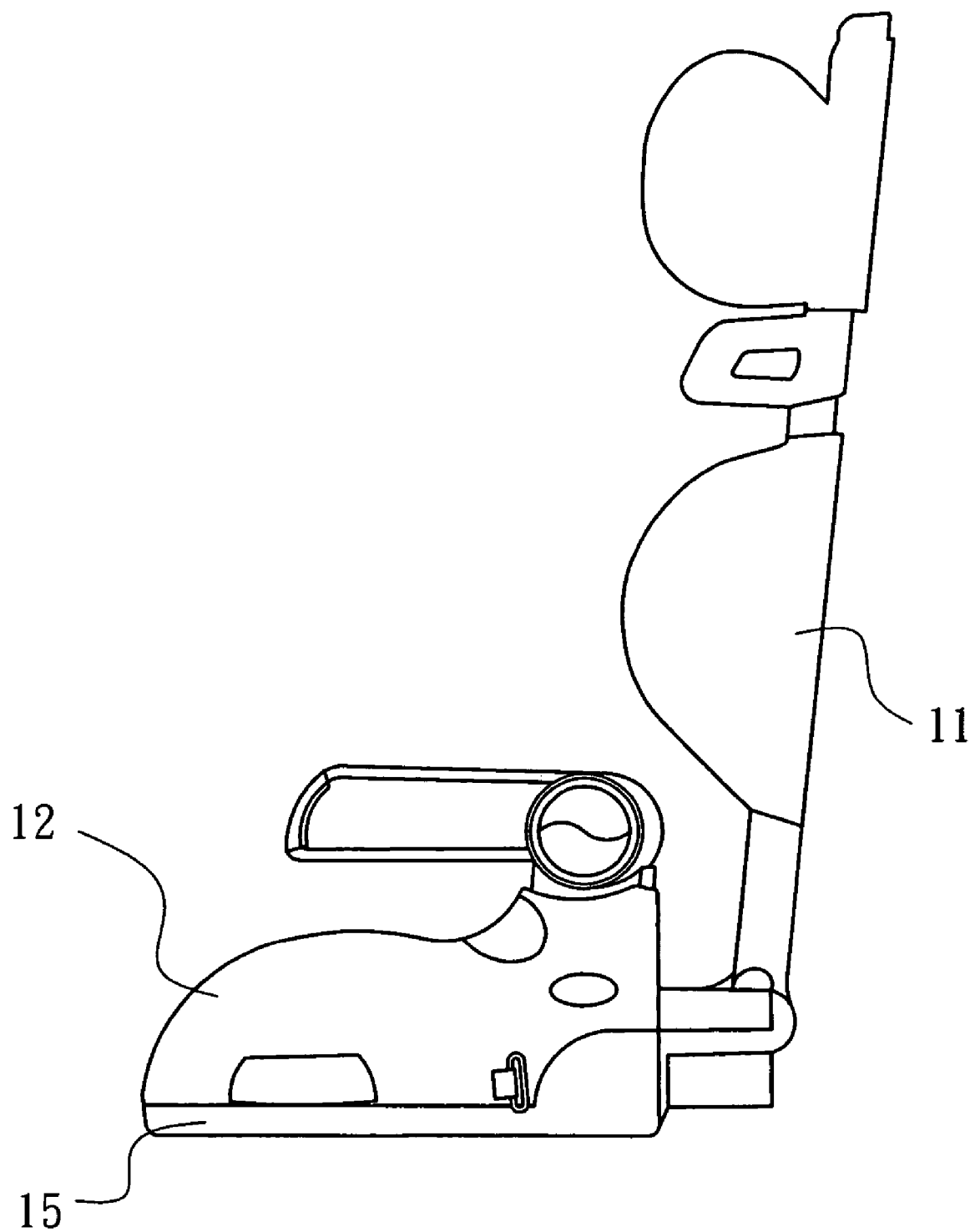
FIGS. 3A and 3B are side views of the child safety seat with the tilt adjustment mechanism according to the first embodiment of the present invention after and before adjusting.
Figure 4A:
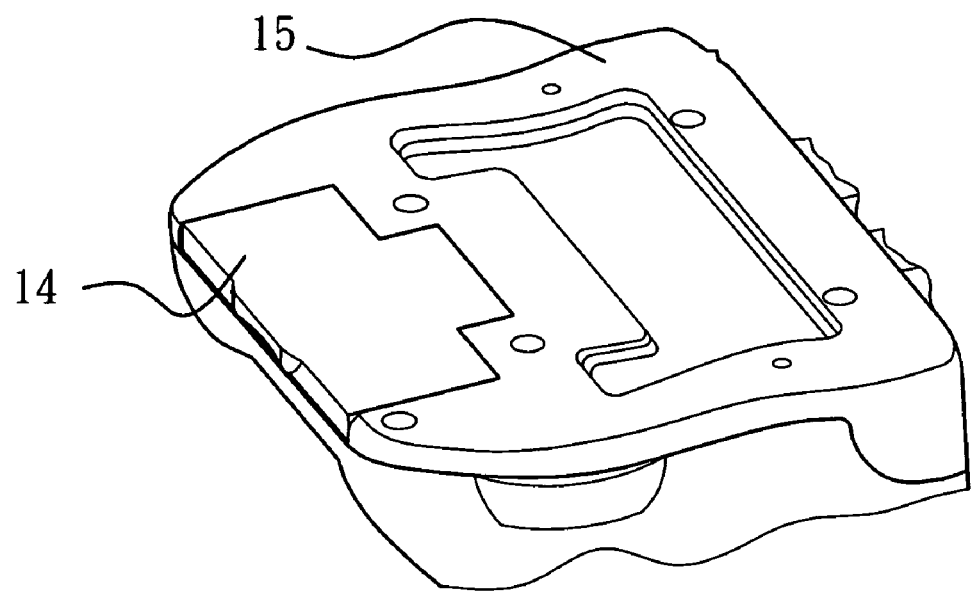
FIGS. 4A and 4B are bottom views of the child safety seat with the tilt adjustment mechanism according to the first embodiment of the present invention after and before adjusting.

Next, the operation method of the tilt adjustment mechanism will be described in the following. The bottom surface of the lower-seat portion 15 and the bottom portion 162 of the support block 14 are abutted with the surface of a car seat when the child safety seat is disposed on the car seat. On one hand, when a user intends to adjust angle of the child safety seat 1, the first protruding portion 142 or the second protruding portion 141 of the support block 14 is selectively engaged with the recess 121 so as to make the child safety seat 1 to be at different angles. As shown in FIG. 6A, the second protruding portion 141 is engaged with the recess 121 and the column portion 131 of the button 13 contact with the second protruding portion 141 while the bottom portion 162 of the support block 14 is substantially parallel to the bottom surface of the lower-seat portion 15, as shown in FIGS. 3A and 4A.

Figure 3B:
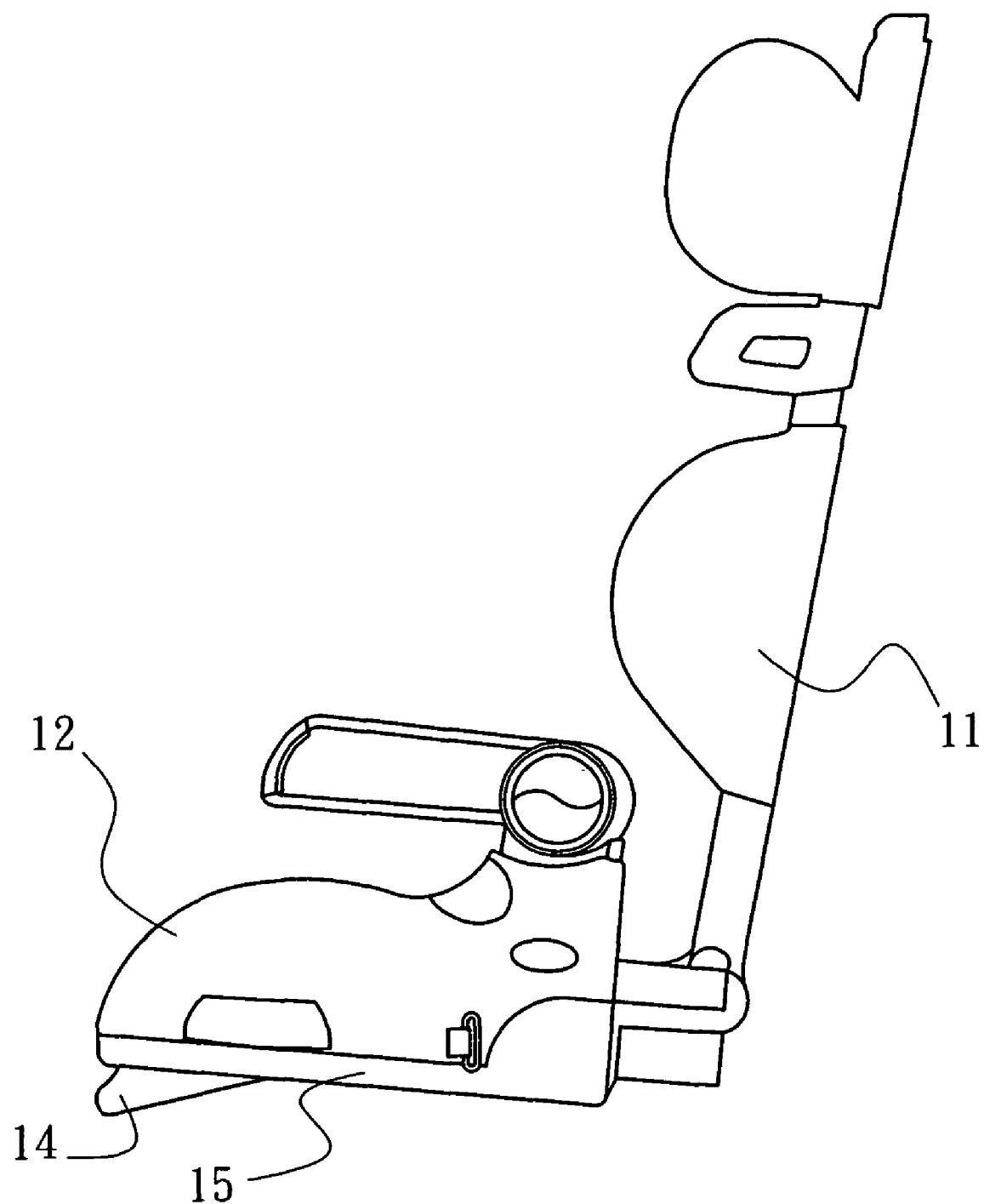
Figure 4B:
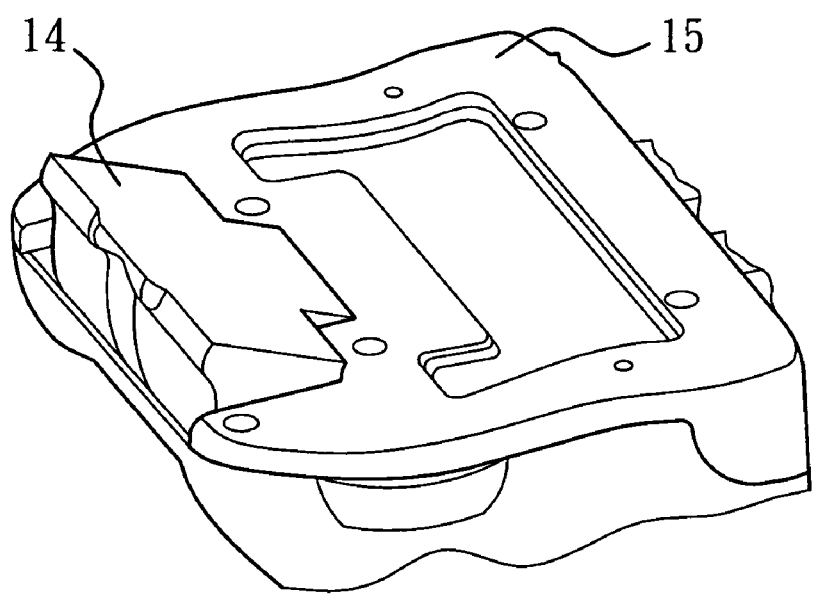

As shown in FIG. 6B, when a user intends to tilt the child safety seat 1, the button 13 is pressed against the second protruding portion 141 such that the plate-like portion 143 is deformed as a result of resilience and the second protruding portion 141 is disengaged from the recess 121; in the meantime, pull at the support block 14 downwardly such that the support block 14 may rotate around the lower-seat portion 15, and thus the first protruding portion 142 is engaged with the recess 121 and the support block 14 is at an angle with respect to the lower-seat portion 15, as shown in FIGS. 3B and 4B. Accordingly, the purposes and functions of adjusting angle of the upper-seat portion 12 and the child safety seat 1 can be achieved, and thus adjusting a comfortable position for a user can be provided. On the other hand, when a user intends to restore the former original position, press the button 13 and pull at the support block 14 and let the support block 14 rotate around the lower-seat portion 15 such that the second protruding portion 141 of the support block 14 is engaged with the recess 121 and thus the restoring of the child safety seat 1 may be achieved. It should be appreciated that the support block 14 may include two protruding portions 141 and 142 in the first embodiment of the present invention, while it is illustrative but not to limit its scope.

According to the above-mentioned, a child safety seat 1 with a tilt adjustment mechanism according to the embodiment is provided, which is utilized to adjust angle of the child safety seat by biasing the button 13 and pressing toward the support block 14 such that the recess 121 would engage with different protruding portions, and thus the operation method of the child safety seat 1 with a tilt adjustment mechanism and its structure are indeed different with the related prior arts and the improved tilt adjustment mechanism 1 could indeed achieve the purposes and the features of the present invention.

Second Embodiment

Figure 7:
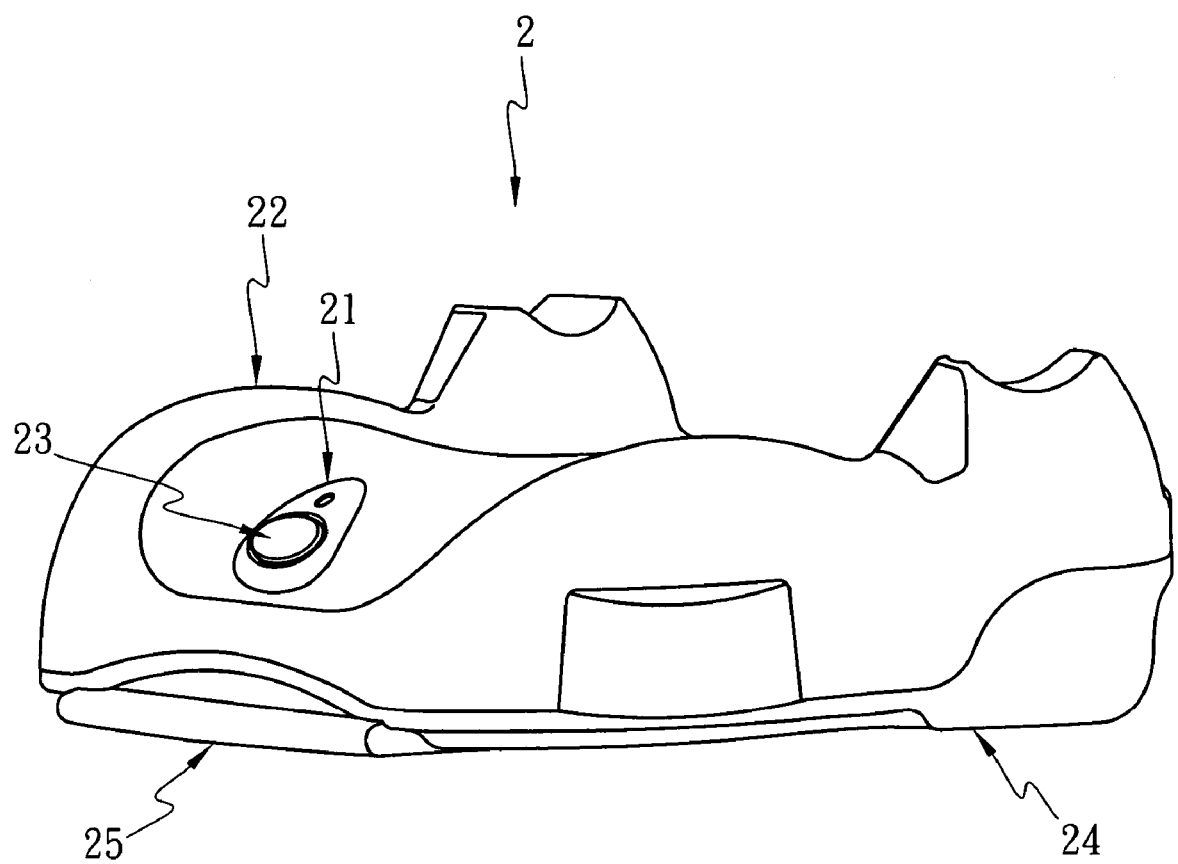
FIG. 7 is a schematic view illustrating the entire appearance of a tilt adjustment mechanism according to the second embodiment of the present invention.
Figure 9:
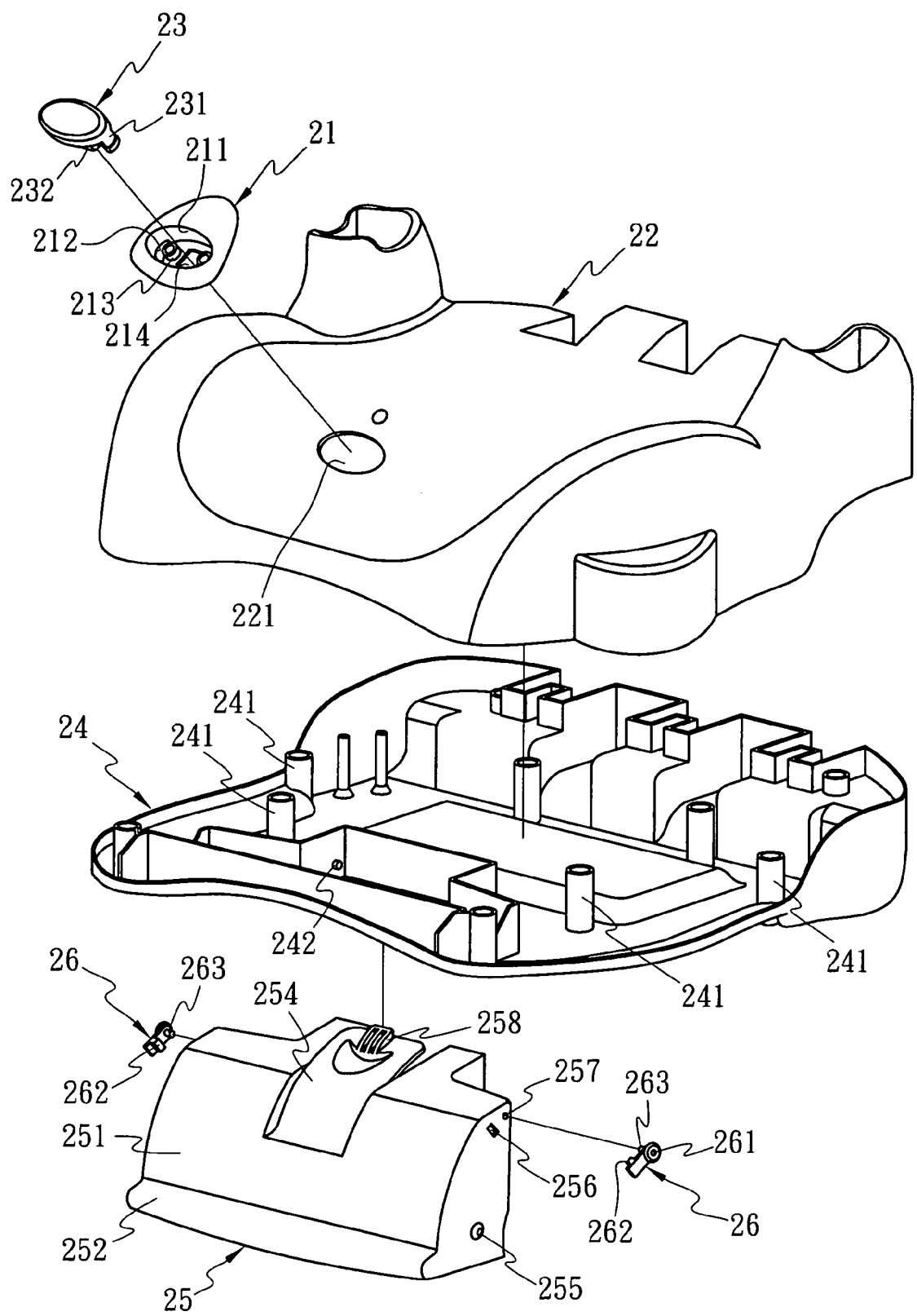
FIG. 9 is a schematic view illustrating the members of the tilt adjustment mechanism according to the second embodiment of the present invention in details.
Figure 10A:
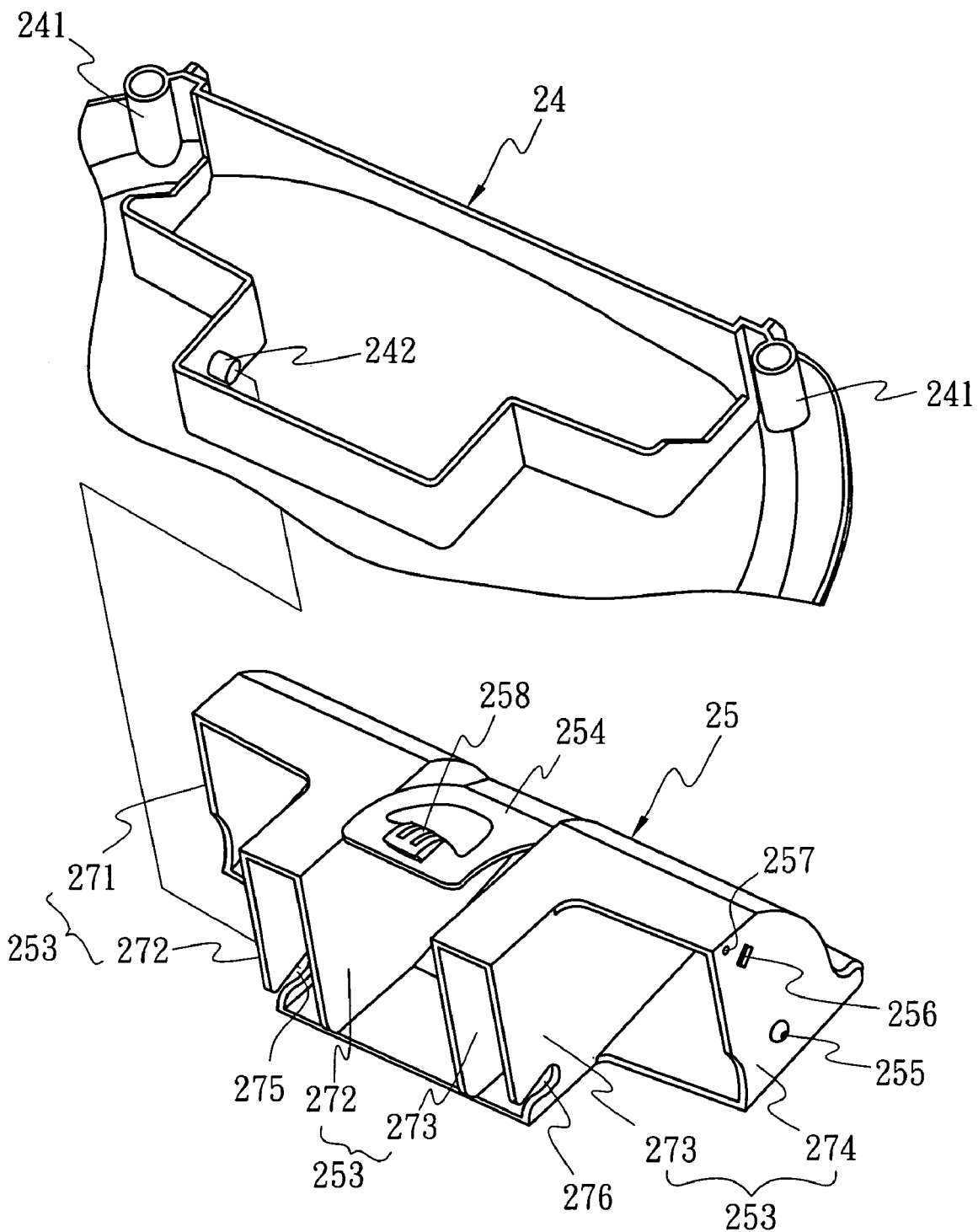
FIG. 10A is a perspective view illustrating the support block and the upper-seat portion according to the second embodiment of the present invention.
Figure 10B:
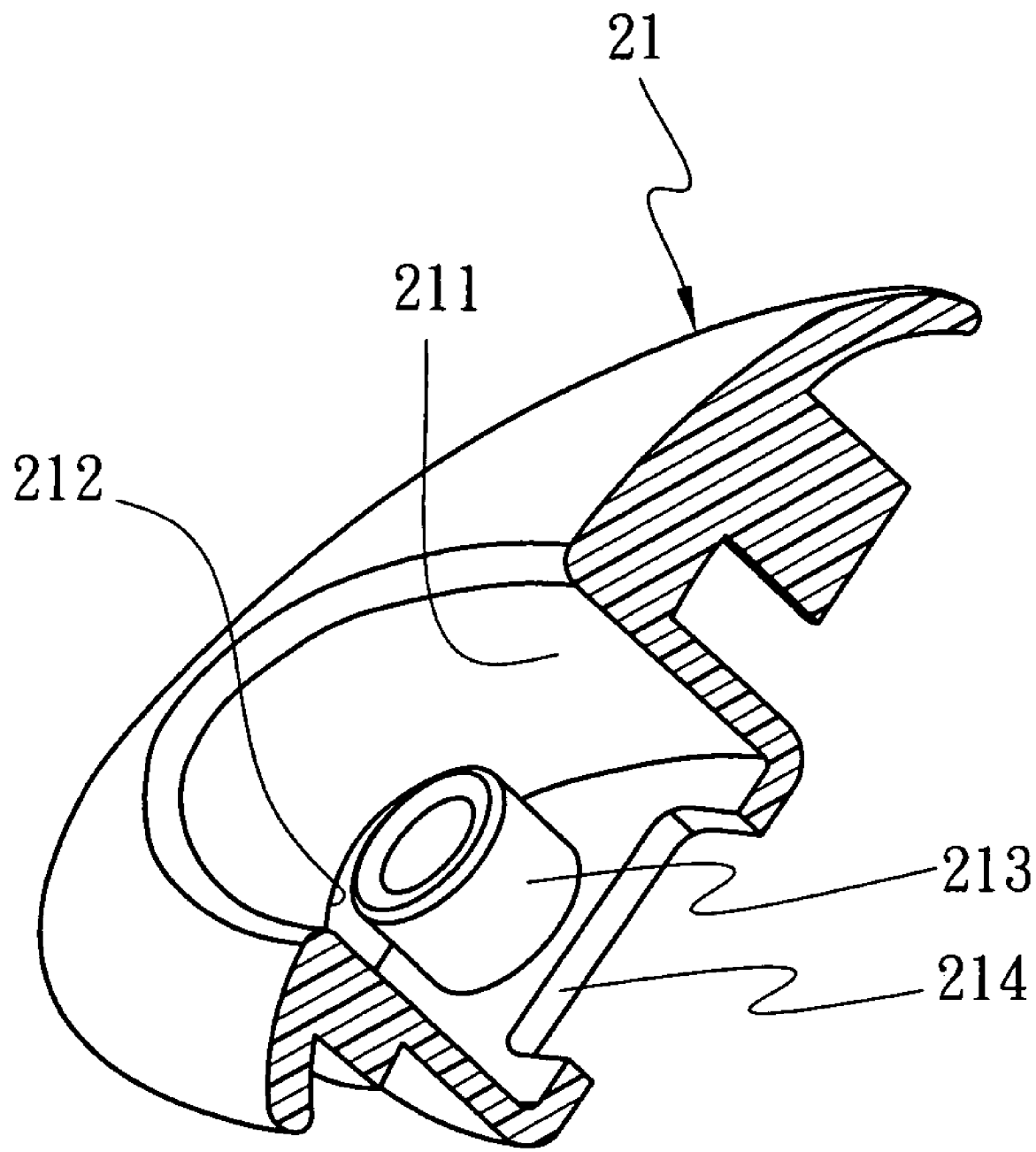
FIG. 10B is a cross-sectional view of the button cover according to the second embodiment of the present invention.
Figure 11:
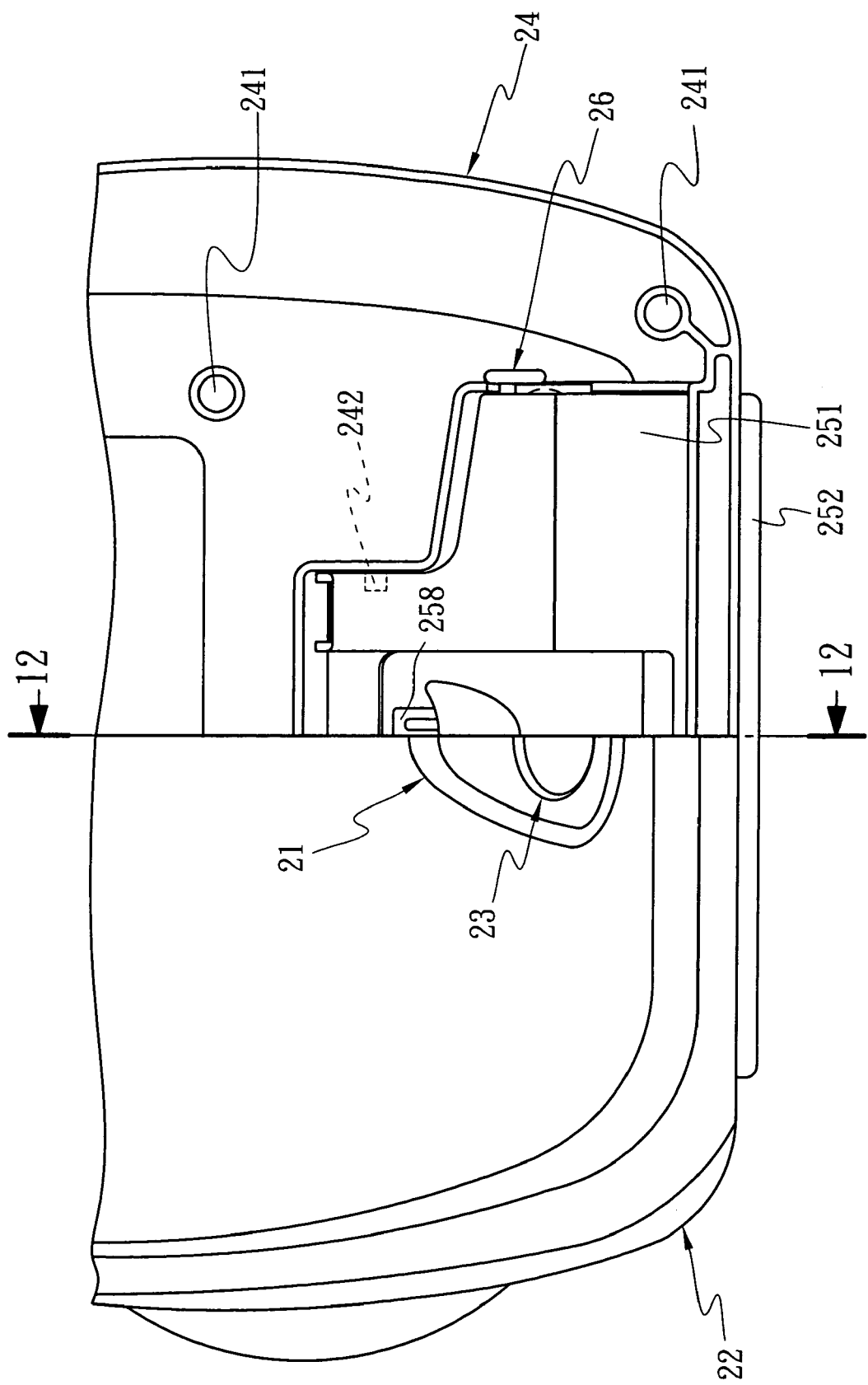
FIG. 11 is a part perspective view of the tilt adjustment mechanism according to the second embodiment of the present invention.

As shown in FIG. 7, the second embodiment of a tilt adjustment mechanism 2 according to the present invention includes a button cover 21, an upper-seat portion 22, a button 23, two stops 26 (which will be described further in the following by referring to FIG. 9), a lower-seat portion 24 and a support block 25 disposed below the front of the upper-seat portion 22, wherein each of the stops 26 is fastened to the support block 25 by a fastening device, such as a rivet and a bolt, and the button 23 is coupled to the button cover 21, as shown in FIG. 10B.

As shown in FIGS. 9 and 10A, the upper-seat portion 22 includes a hole 221 in the front thereof, and the button 23 includes a column portion 232, and two hook-shaped prongs 231 opposite to each other and connected to the column portion 232, wherein two rods are disposed at two sides of the column portion 232, and the rods are respectively positioned between each prong 231 and the column portion 232. The button cover 21 includes a recess 211, two column parts 213 (while only a column part 213 is shown in FIG. 9 since it is restricted to angle of view), two through holes 212 communicated with the recess 211 and adjacent to the two column parts 213 respectively and an engaging hole 214 substantially square-shaped (shown in FIG. 10B), wherein two column parts 213 and the engaging hole 214 are disposed within the recess 211, the engaging hole 214 is disposed between the two column parts 213, and the button cover 21 is coupled to the hole 221 of the upper-seat portion 22. Each of the two stops 26 includes a penetrated hole 261, a cylindrical portion 263 and a fixing portion 262, wherein the penetrated hole 261 is disposed at one side of the stops 26 and the cylindrical portion 263 and the fixing portion 262 are disposed at another side thereof.

Further, the section of the support block 25 is substantially in a form of sector from a cross-sectional view, and the support block 25 mainly includes a bottom portion 252, a wall portion 253 and a top portion 251 which is at an angle connected to the bottom portion 252 and the wall portion 253 is integrally connected between the bottom portion 252 and the top portion 251, and the support block 25 further includes a plate-like portion 254 having a protruding portion 258 formed thereon, and the end of the protruding portion 258 is hook-shaped, wherein the plate-like portion 254 is elastic-deformed since one side of the plate-like portion 254 is integrally connected to the top portion 251 and the two sides in the front of the plate-like portion 254 is separated from the top portion 251. In addition, a nib 255, a first opening 256 and a second opening 257 are respectively disposed in the wall portion 253 of the support block 25, wherein the nib 255 is disposed in the lower of the wall portion 253 and near the bottom portion 252 and the first opening 256 and the second opening 257 are disposed near the upper of the wall portion. Besides, it is noted that each of the stops 26 is disposed above the nib 255. As shown in FIG. 10A, the wall portion 253 of the support block 25 includes a first wall 271, a second wall 272, a third wall 273 and a forth wall 274, and the first wall 271 and the forth wall 274 are disposed in the most outward of the wall portion 254, and each of the second wall 272 and the third wall 273 has a first C-shaped notch 275 and a second C-shaped notch 276 in the lower portion thereof to be coupled to the lower-seat portion 24. It should be appreciated that the plate-like portion 254 is disposed between the second wall 272 and the third wall 273 in this embodiment of the present invention.

Referring back to FIGS. 9 and 10A, the lower-seat portion 24 mainly includes an upper surface, a bottom surface and two pivot mounts 242 disposed in the front end thereof and is in a form of cylindrical shape (while only a pivot mount is shown in FIG. 10A since it is restricted to angle of view), and a plurality of rods 241 are disposed on the top surface and the rods 241 may be cylindrical or other shaped rods.

The two prongs 231 of the button 23 may directly hook the through holes 212 of the button cover 24 through the hook-shaped portion of the prongs 231 such that the button 23 is received within the recess 211 of the button cover 21, wherein the two rods is disposed within the column part 213 such that the button 23 is moved upwardly or downwardly within the recess 211, and partly of the button cover 21 is disposed in the hole 221 and fastened to the upper-seat portion 22 by a screw (not shown) and the button 23 is functioned as removing the protruding portion 258. Each of the stops 26 is fastened to the support block 25 by using a rivet (not shown) to penetrate the penetrated hole 261 and then pass through the cylindrical portion 263 and is disposed within the second opening 257 of the support block 25, while the fixing portion 262 of the stops 26 is coupled to the first opening 256 of the support block 25.

The two nibs 255 of the support block 25 are utilized to interfere with the lower-seat portion 24 and the support block 25 is restricted at the original position such that the support block 25 is not easy to move. The stops 26 are utilized to interfere with the lower-seat portion 24, and the lower end of the fastening piece 26 would contact with the sidewall of the lower-seat portion 24 when the support block 25 rotates at a certain angle so as to prevent the support block 25 fully removing from the upper-seat portion 22. The support block 25 is connected to the lower-seat portion 24 by coupling the C-shaped notches 275, 276 of the support block 25 with the pivot mounts 242 of the lower-seat portion 24 such that the support block 25 is rotated relative to the seat portion. After the combination thereof, the lower-seat portion 24 is fixedly connected to the upper-seat portion 22 and the support block 25 is pivotally connected to the lower-seat portion 24.

Figure 8A:
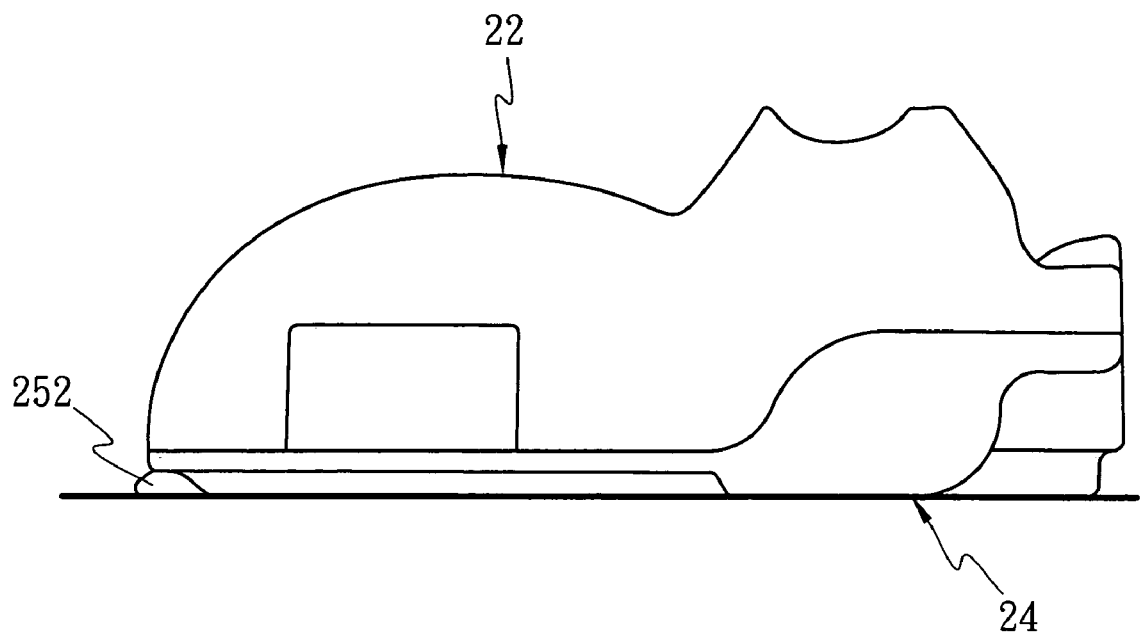
FIGS. 8A and 8B are side views of the tilt adjustment mechanism according to the second embodiment of the present invention after and before adjusting.
Figure 8B:
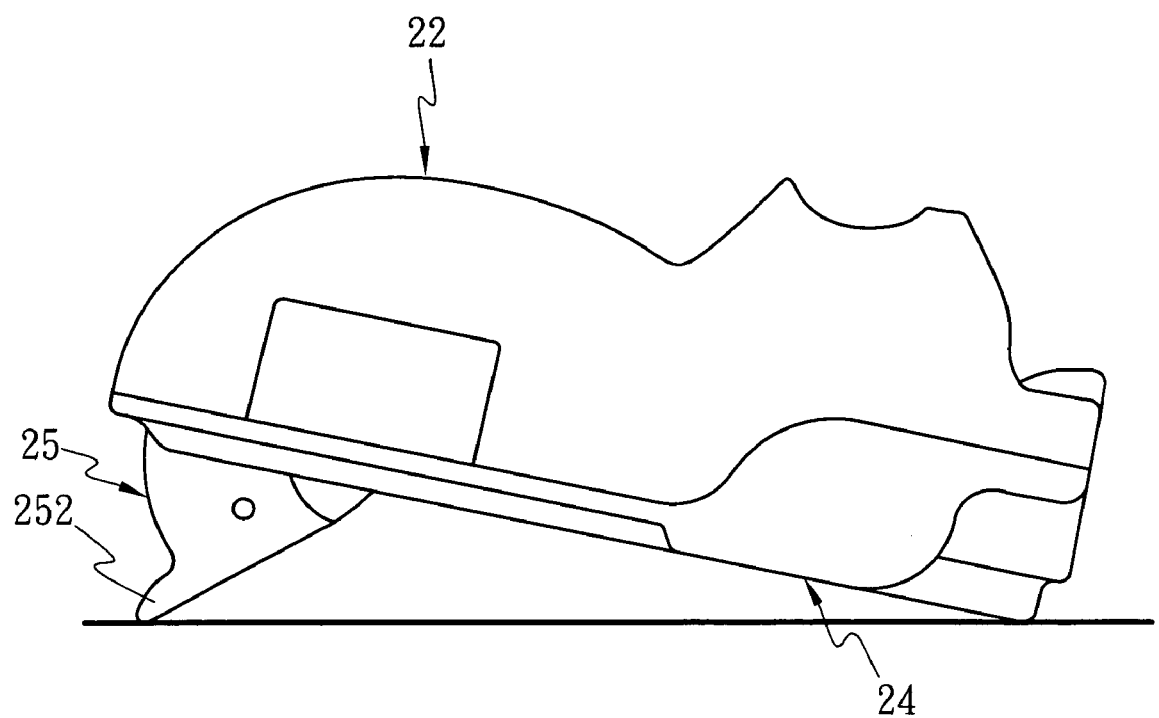
Figure 12A:
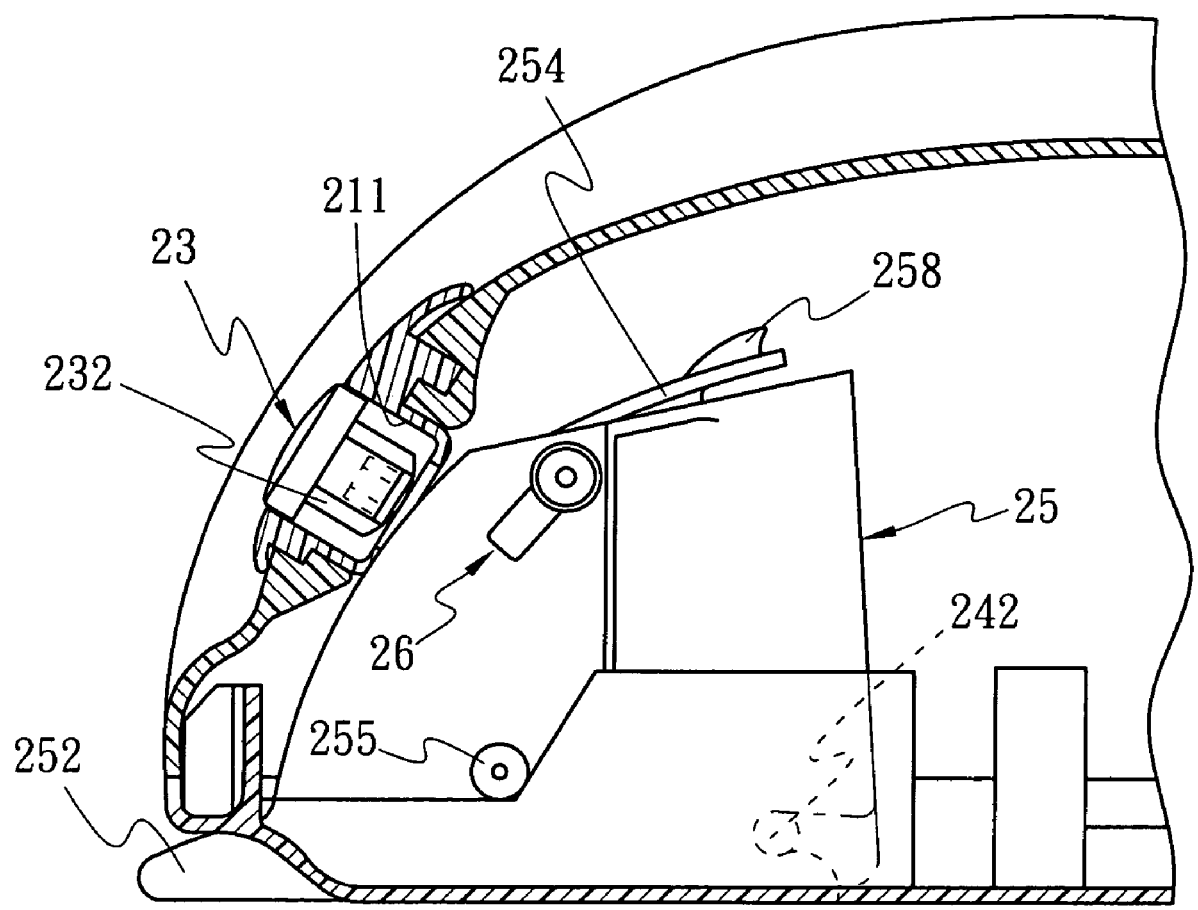
FIGS. 12A-12C are side views of the tilt adjustment mechanism according to the second embodiment of the present invention illustrating the operation states of the tilt adjustment mechanism.
Figure 12B:
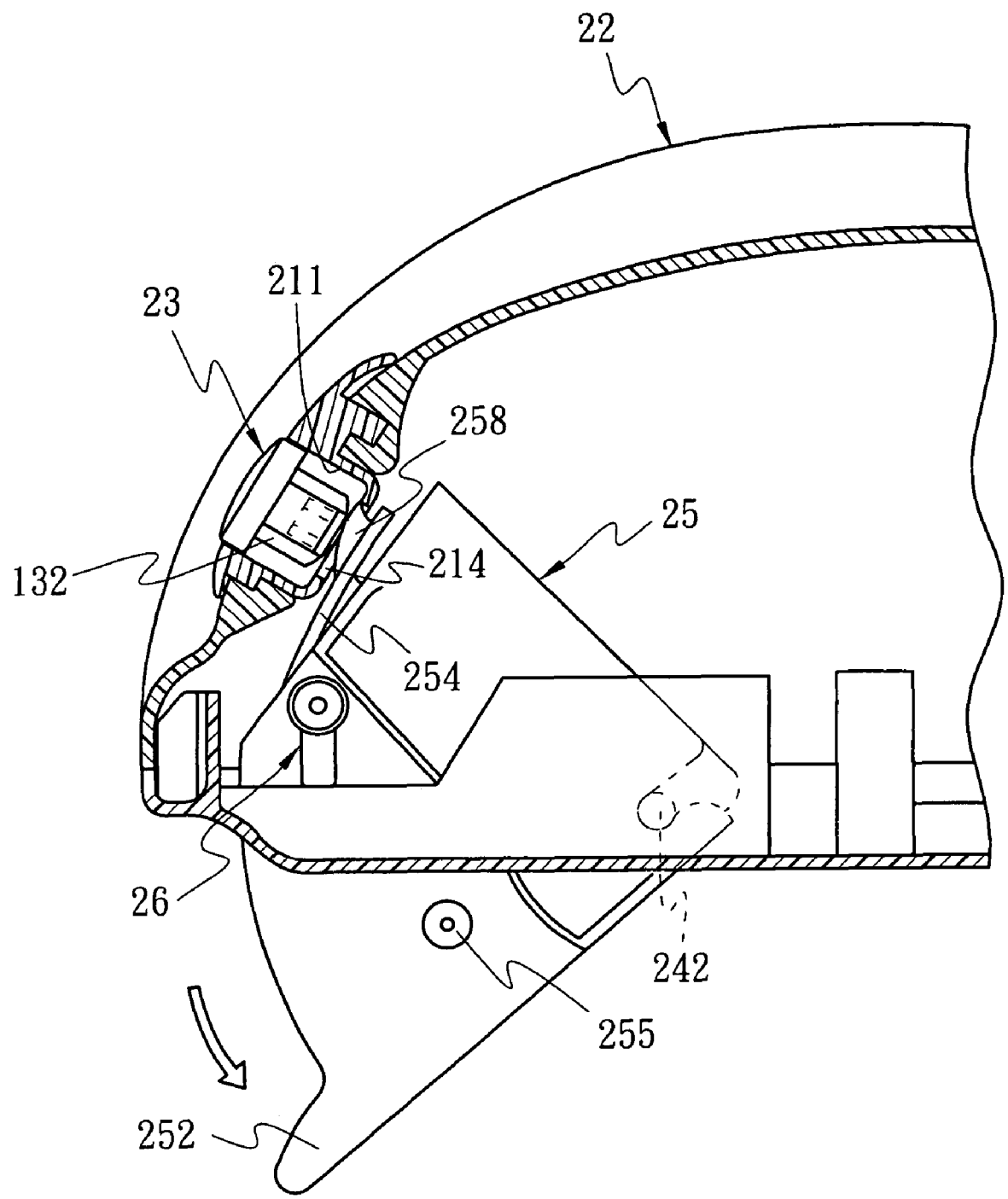
Figure 12C:
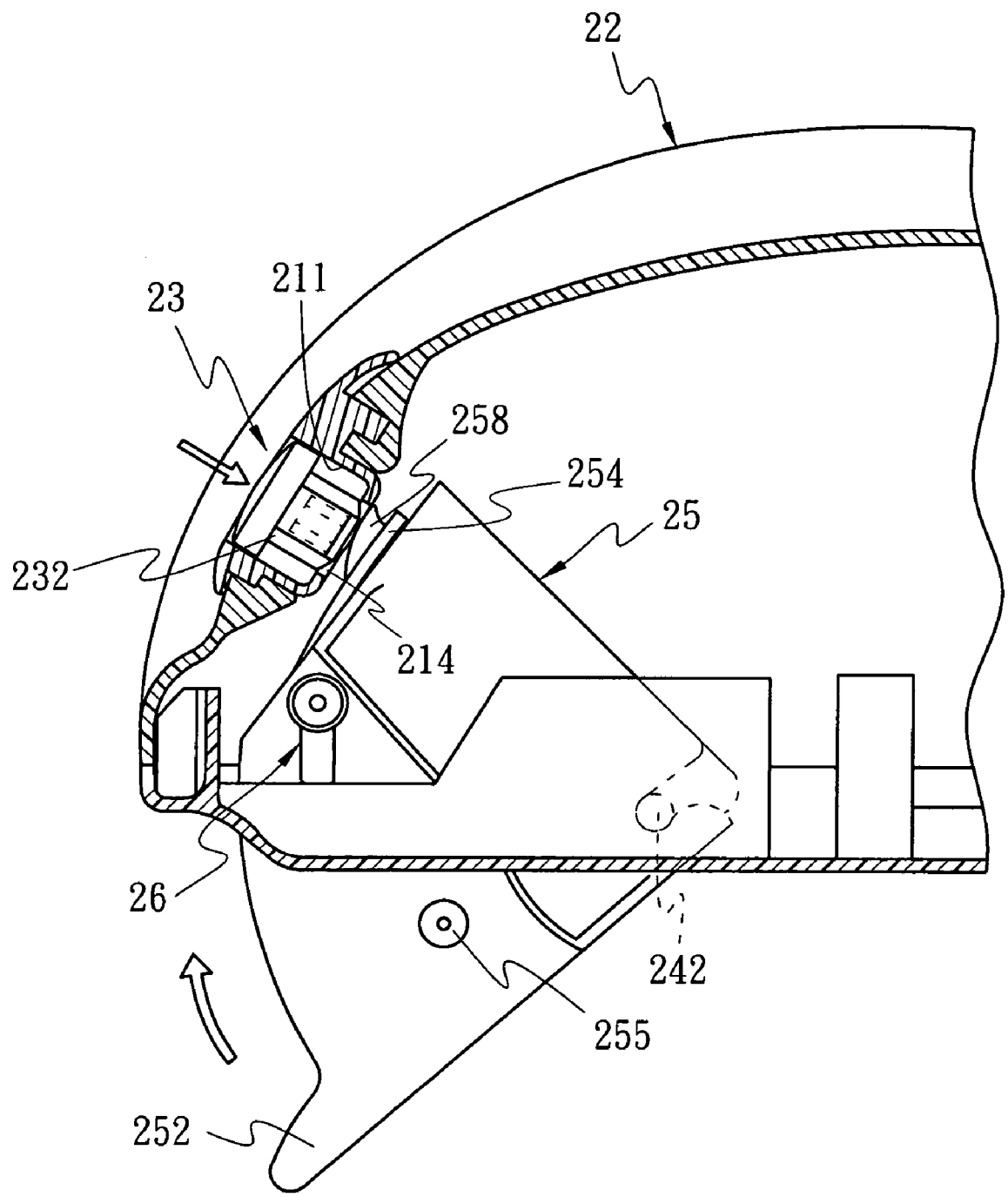

Next, the operation method of the tilt adjustment mechanism 2 will be described in the following. The bottom surface of the lower-seat portion 24 and the bottom portion of the support block 25 are abutted with the surface of a car seat when the child safety seat is disposed on the car seat. FIG. 8A is a side view of the tilt adjustment mechanism 2 before adjusting, and the bottom portion of the support block 25 is parallel to the bottom surface of the lower-seat portion 24 as shown in FIG. 8A, wherein the nibs are functioned as interfering with the lower-seat portion 24. As shown in FIG. 12A, the nibs 255 contact with the lower-seat portion 24 at this time. Referring now to FIGS. 12A~12C in which the side views of the tilt adjustment mechanism 2 according to the second embodiment of the present invention are illustrated to describe the operation states of them. When a user intends to adjust the tilt adjustment mechanism 2 of the child safety seat, pull at the support block 25 by hands to let the support block 25 pivotally rotates with respect to the upper-seat portion 22, such that the protruding portion 258 of the support block 25 is engaged with the engaging hole 214 of the button cover 21 and thus the effect of adjusting would be achieved. Additionally, FIG. 8B is a side view of the tilt adjustment mechanism 2 after adjusting, and there is an angle between the bottom of the support block 25 and the bottom surface of the lower-seat portion 24 while the protruding portion 258 is abutted against the column portion 232. The protruding portion 258 further includes a hook-shaped end so as to retain the protruding portion 258 within the engaging hole 214.

On the other hand, when a user intends to restore the tilt adjustment mechanism 2, press the button 23 and pull at the support block 25 by hands to let the column portion 232 of the button 23 be pressed against the protruding portion 258 such that the plate-like portion 254 is deformed as a result of resilience and the protruding portion 258 is disengaged from the engaging hole 214 accordingly, and thus the support block 25 may pivotally rotate so as to restore the former original position and the restoring thereof and the adjusting of the tilt adjustment mechanism 2 could be achieved. Additionally, the bottom of the support block 25 is substantially parallel to the bottom surface of the lower-seat portion 24 as shown in FIG. 8A. It should be appreciated that the stops 26 may be replaced by a component similar with the nibs 255 in another preferred embodiment, two springs (not shown) for restoring the button 23 are disposed around the column parts 213 and the column portion 232, while it is illustrative but not to limit its scope.

According to the above-mentioned, a tilt adjustment mechanism 2 according to the embodiment is provided, which is utilized to adjust angle of the child safety seat by using the support block 25 pivotally rotated with respect to the seat portion and to position it by engaging the engaging hole 214 of the upper-seat portion 22 with the protruding portions 258 of the support block 25; and besides, the protruding portions 258 is disengaged from the engaging hole 214 by actuating the button 23 to press against the protruding portions 258, thus the operation method of the tilt adjustment mechanism 2 and its structure are indeed different with the related prior arts and the improved tilt adjustment mechanism 2 could indeed achieve the purposes and the features of the present invention.

Third Embodiment

It should be appreciated that the recess 121 described in the first embodiment and the recess 211 described in the second embodiment both correspond to a plurality of through grooves 322 of the third embodiment, while the protruding portions 141 and 142 described in the first embodiment and the protruding portion 258 described in the second embodiment both correspond to a plurality of engaging wedges 355 of the third embodiment.

Figure 13:
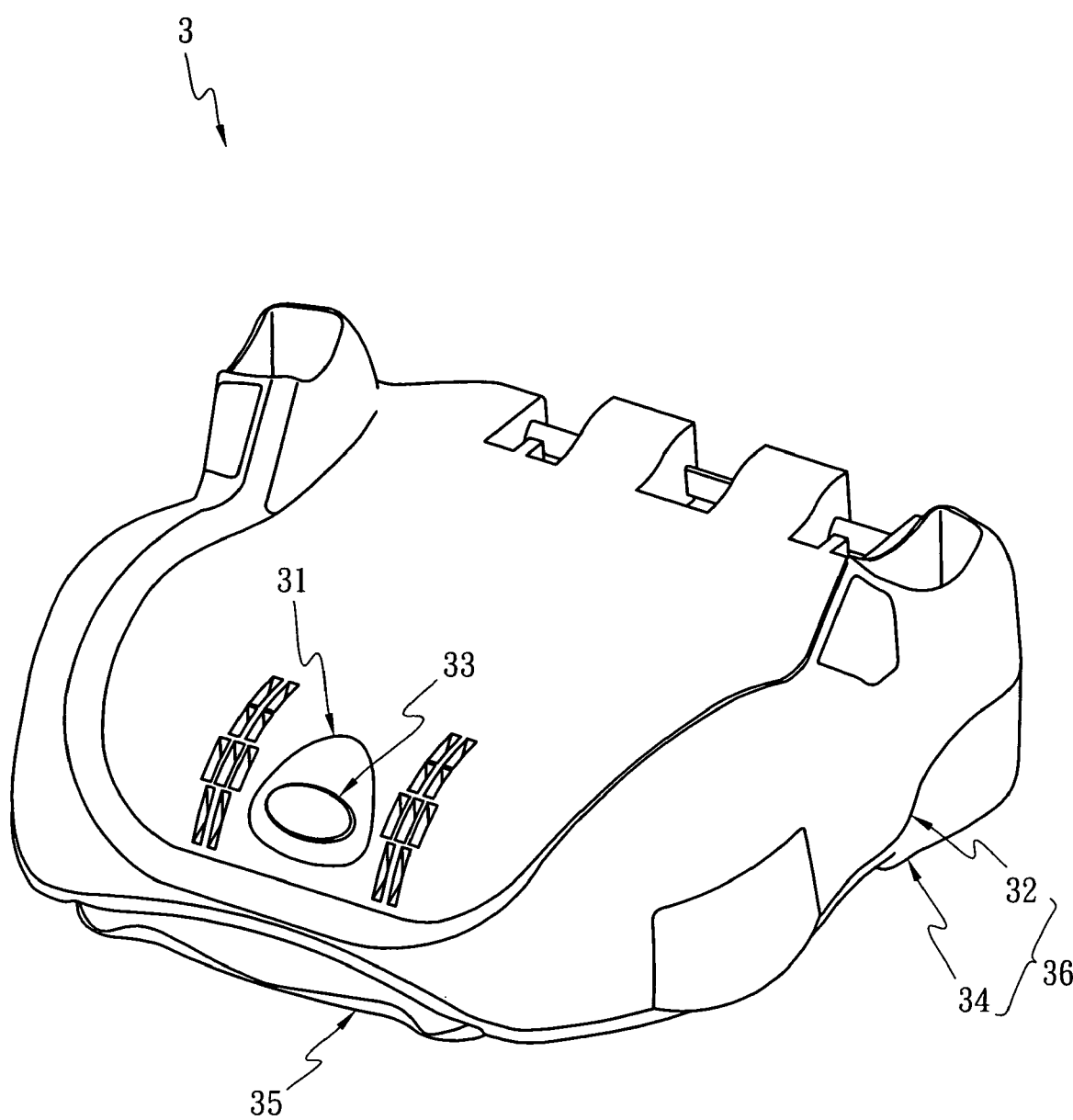
FIG. 13 is a schematic view of a tilt adjustment mechanism according to the third embodiment of the present invention.
Figure 14:
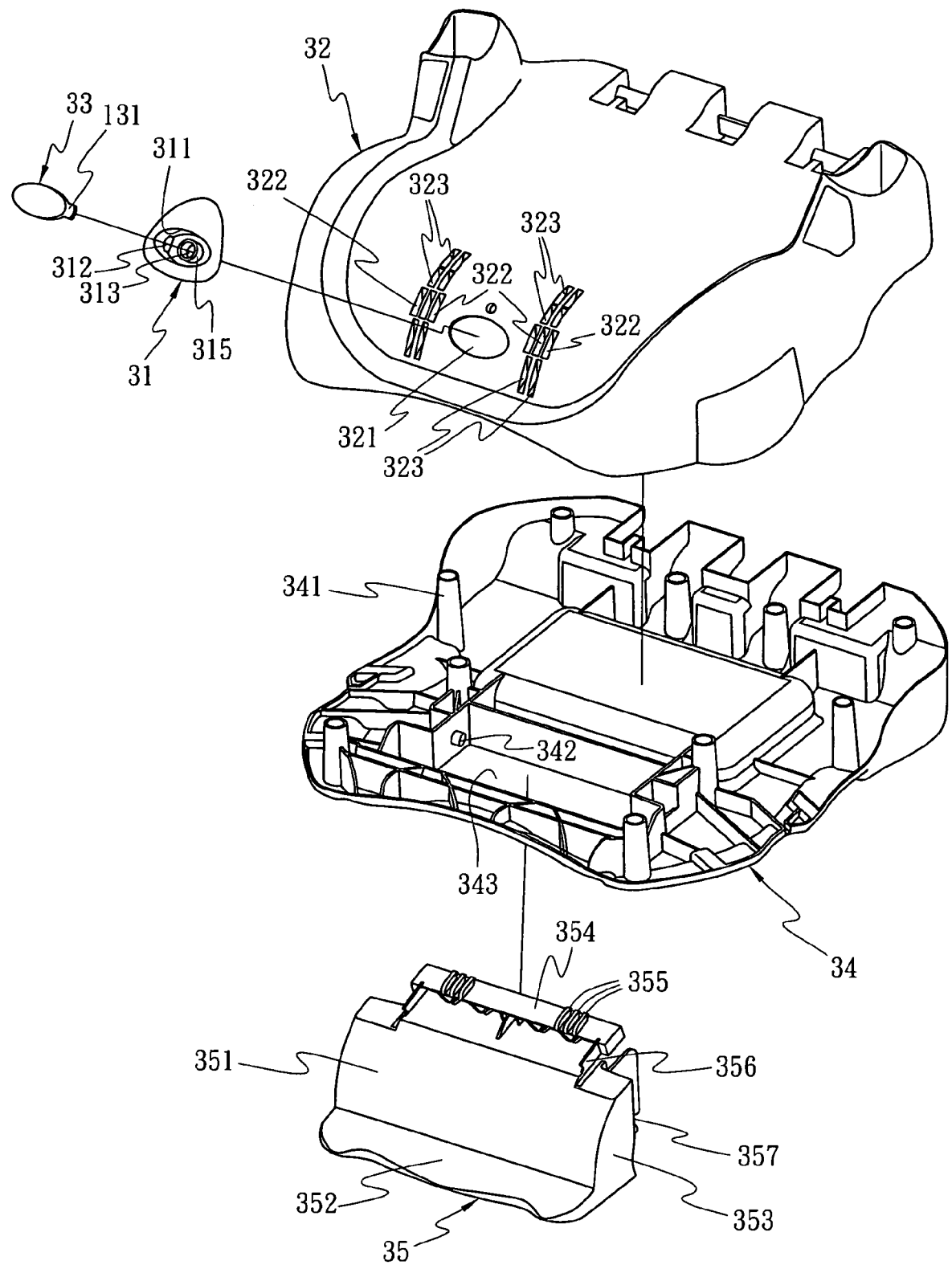
FIG. 14 is an explosive view of the tilt adjustment mechanism according to the third embodiment of the present invention.

As shown in FIG. 13, the third embodiment of a tilt adjustment mechanism 3 according to the present invention is mounted on a child safety seat. The tilt adjustment mechanism 3 includes a seat portion 36 composed of a upper-seat portion 32 and a lower-seat portion 34, a button cover 31, a button 33 and a support block 35 disposed below the front of the upper-seat portion 32, wherein the button 33 is disposed in an opening 311 of the button cover 31 which is shown in FIG. 14, and the support block is pivotally connected to the seat portion 36. On the whole, the support block 35 may pivotally rotate with respect to the seat portion 36 such that the tilt adjustment mechanism 3 may adjust relative tilt angle and adjust a comfortable position for a user.

Figure 15:
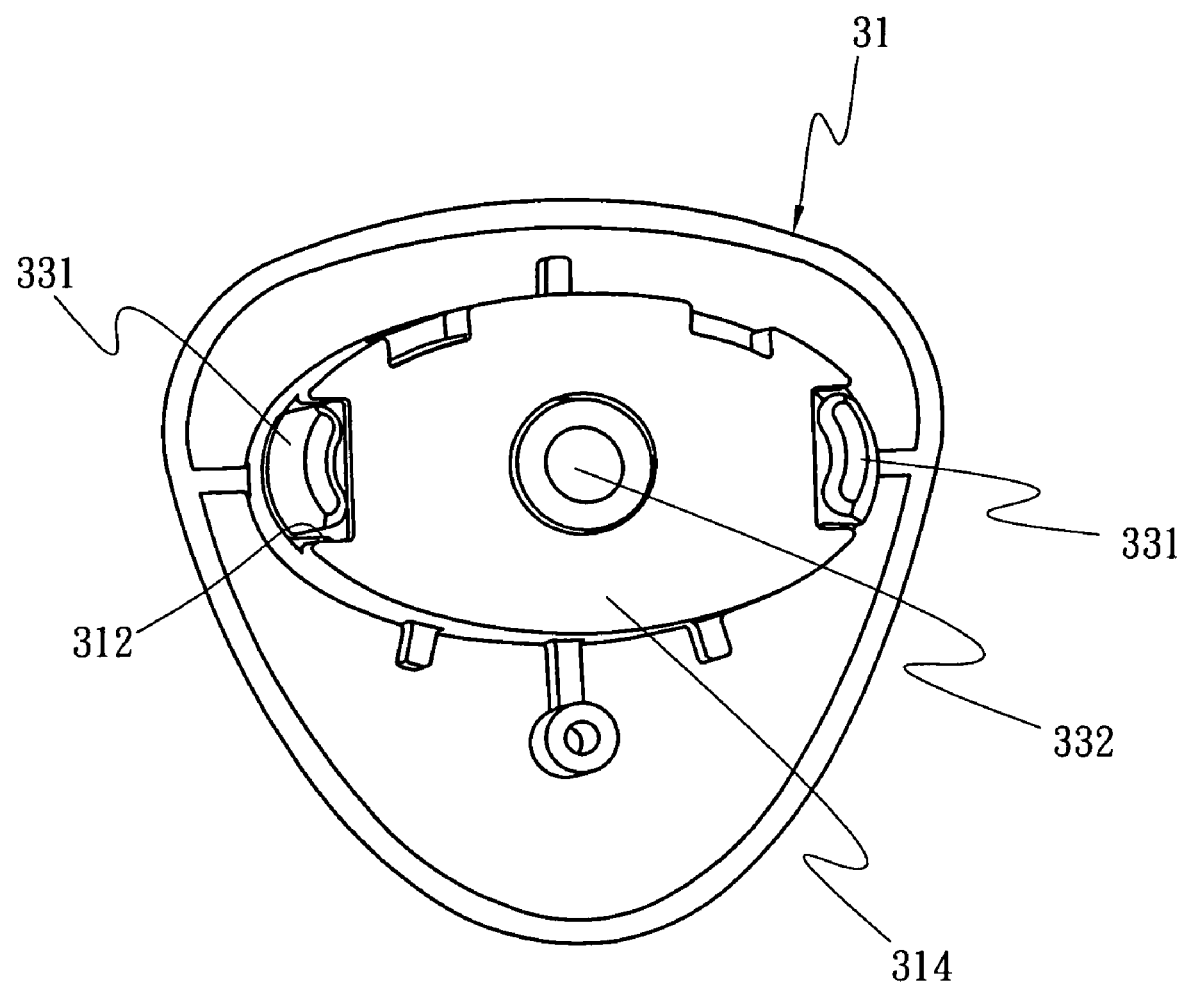
FIG. 15 is a bottom view of the button and the button cover according to the third embodiment of the present invention.

As shown in FIG. 14, the upper-seat portion 32 includes a hole 321 in the front thereof, and a plurality of through grooves 322 and a plurality of dummy grooves 323 are formed at two sides of the hole 321, and the button 33 includes a column portion 332 (shown in FIG. 15) and two prongs 331 disposed at two sides of the column portion 332. As shown in FIGS. 14 and 15, the button cover 31 includes an opening 311, an aperture 313, a button-cover bottom 314 which is defined the bottom wall of the opening 311 and two through holes 312 disposed at two sides of the aperture 313 while only a through hole 312 is shown in FIG. 14 since it is restricted to angle of view, wherein the aperture 313 is disposed on the button-cover bottom 314, and a hollow cylinder portion 315 is mounted on the button-cover bottom 314 where the aperture 313 is disposed therein.

Further, the section of the support block 35 is substantially in a form of sector from a cross-sectional view, and the support block 35 mainly includes a bottom portion 352, a wall portion 353 and a top portion 351 which is at an angle connected to the bottom portion 352 and the wall portion 353 is integrally connected between the bottom portion 352 and the top portion 351; another end of the top portion 351 extends to a plate-like portion 354, and the plate-like portion 354 is elastic-deformed since the two sides thereof are not connected to the wall portion 353, and a plurality of engaging wedges 355 are disposed at two sides of the plate-like portion 354 which correspond to the plurality of through grooves 322, and the end of the engaging wedge 355 is hook-shaped; and stops 356 are disposed adjacent to the top portion 351 to avoid adjusting beyond the movement degree required; and several C-shaped notches 357 are disposed in the lower of the wall portion 353 for being engaged with the support block 35. In addition, the lower-seat portion 34 mainly includes a top surface, a bottom surface, a vent 343 penetrated through the top and bottom surface, and two pivot mounts 342 disposed in the front end thereof and is in a form of cylindrical shape (while only a pivot mount 342 is shown in FIG. 14 since it is restricted to angle of view), wherein the pivot mounts 342 are disposed at two sides of the vent 343, and a plurality of rods 341 are disposed on the top surface and the rods 341 may be cylindrical or other shaped rods, while it is illustrative but not to limit its scope. The support block 35 is disposed within the vent 343 of the lower-seat portion 34 and each of the C-shaped notches 357 is coupled to the pivot mounts 342 of the lower-seat portion 34 so as to connect the support block 35 to the lower-seat portion 34 and thus the support block 35 is pivoted relative to the seat portion. After the combination thereof, the lower-seat portion 34 is fixedly connected to the upper-seat portion 32 by using a rivet in the preferred embodiment and the support block 35 is pivotally connected to the lower-seat portion 34.

The two prongs 331 of the button 33 may directly hook the through holes 312 of the button cover 34 such that the button 33 may combined with the button cover 31, and the button cover 31 is fastened to the upper-seat portion 32 by a screw or other fastening devices such that the opening 311 of the button cover 31 is disposed within the hole 321 of the upper-seat portion 32, and the column portion 332 of the button 33 may pass through the groove 313 of the button cover 31. The plurality of dummy grooves 323 are non-penetrated grooves that simply for adornment and enhancement. In addition, the column portion 332 contacts with the plate-like portion 354 such that the plate-like portion 354 is moved when the button 33 is pressed by a user, and thus the engaging wedges 355 of the plate-like portion 354 are disengaged from the through grooves 322 of the seat portion 36; and the engaging wedges 355 are hook-shaped that are enable to prevent from sliding.

Figure 16:
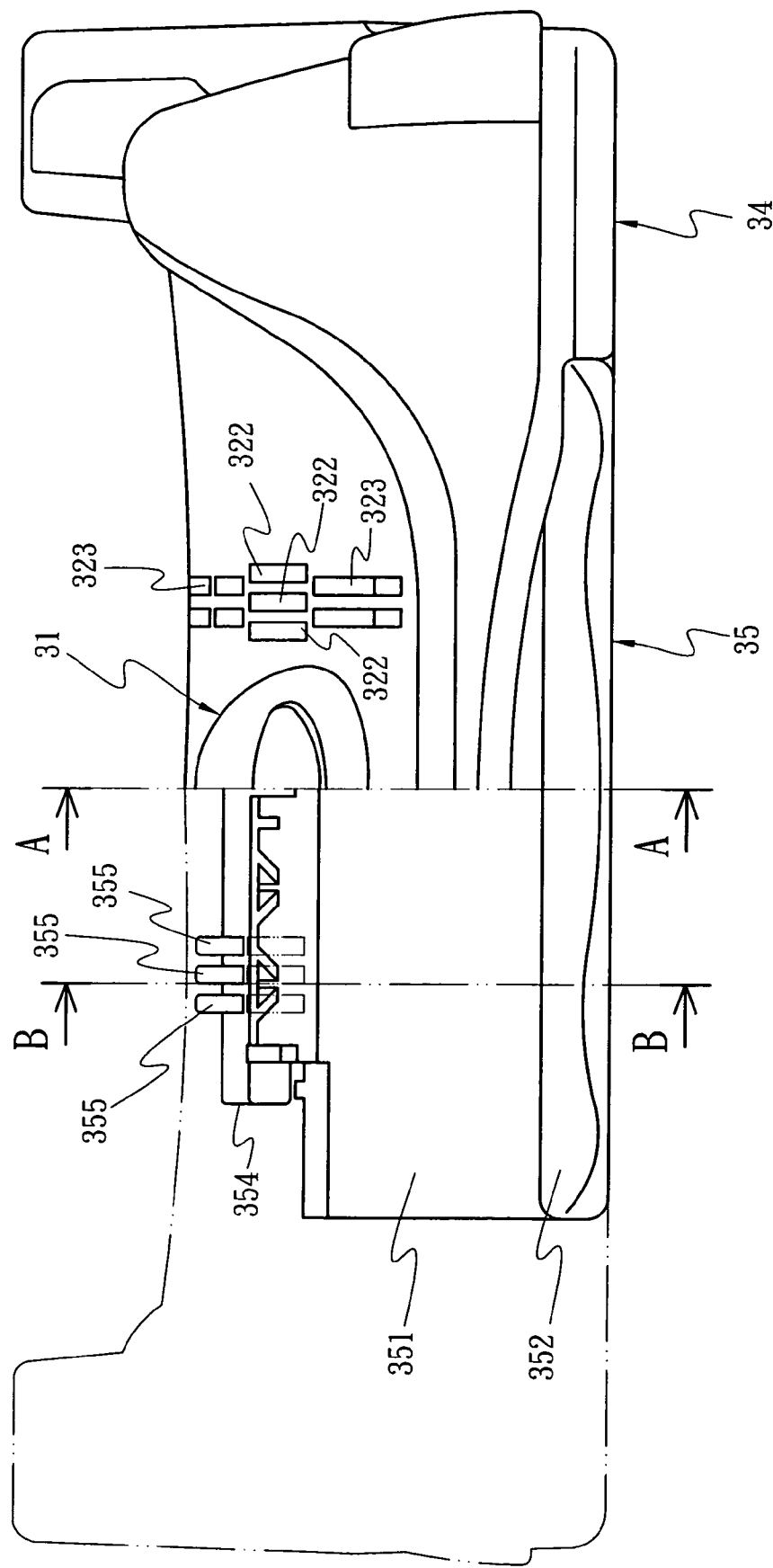
FIG. 16 is a side view of the tilt adjustment mechanism according to the third embodiment of the present invention.
Figure 17A:
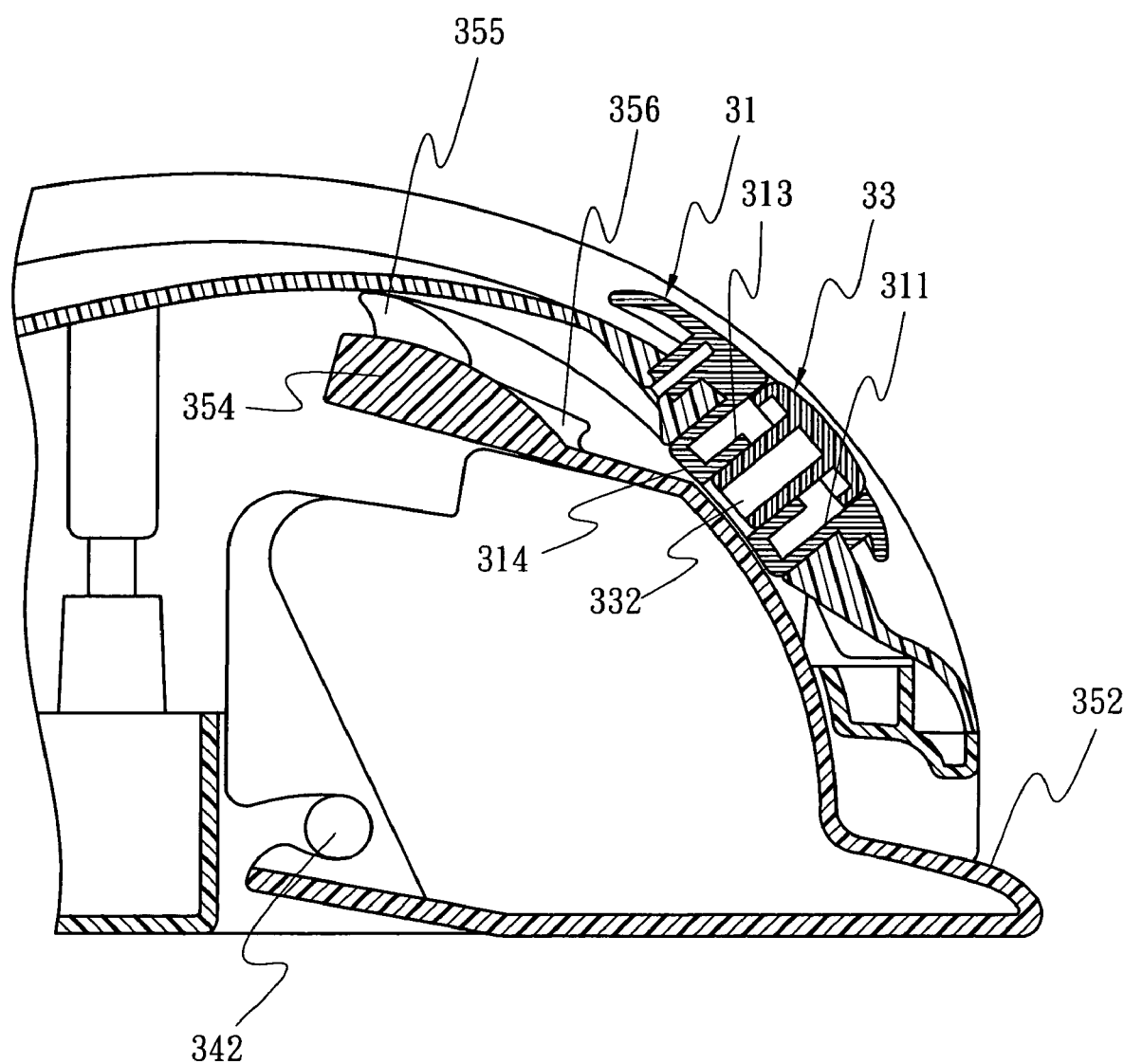
Figure 17B:
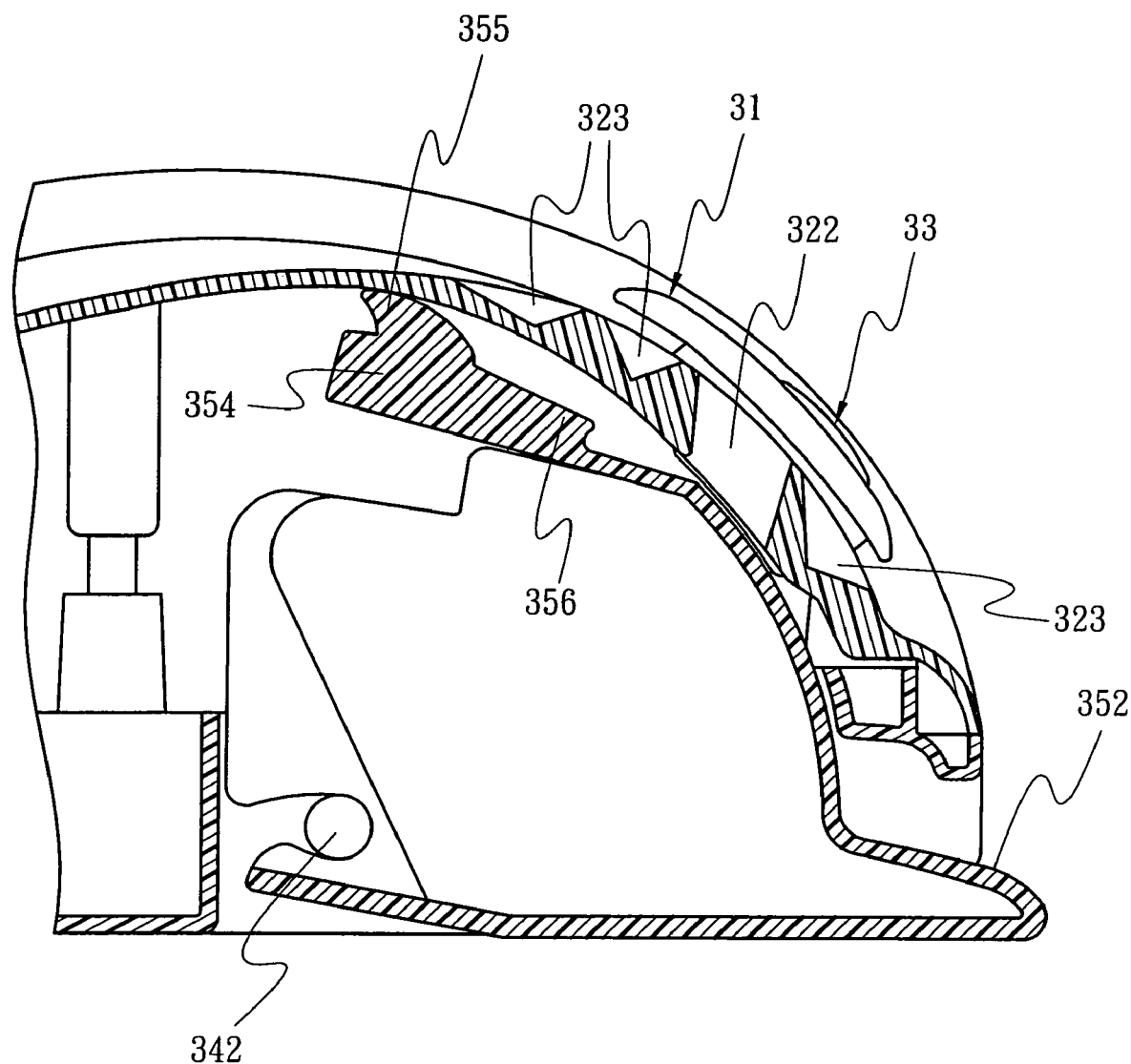

Next, the operation method of the tilt adjustment mechanism 3 will be described in the following. The bottom surface of the lower-seat portion 34 and the bottom portion of the support block 35 are abutted with the surface of a car seat when the child safety seat is disposed on the car seat. FIG. 17A is a side view of the tilt adjustment mechanism 3 before adjusting, and the bottom portion of the support block 35 is parallel to the bottom surface of the lower-seat portion 34 as shown in FIG. 17A. The button-cover bottom 314 of the button cover 31 is positioned above the top portion 351 of the support block 35. Next, FIG. 16 is a side view of the tilt adjustment mechanism 3 according to the third embodiment of the present invention, and FIGS. 17A~19A are the cross-sectional views along with line A-A in FIG. 16 while FIGS. 17B~19B are the cross-sectional views along with line B-B in FIG. 16. The operation states of the tilt adjustment mechanism 3 according to the third embodiment will be set forth in the following by referring FIGS. 17A~19B.

Figure 18A:
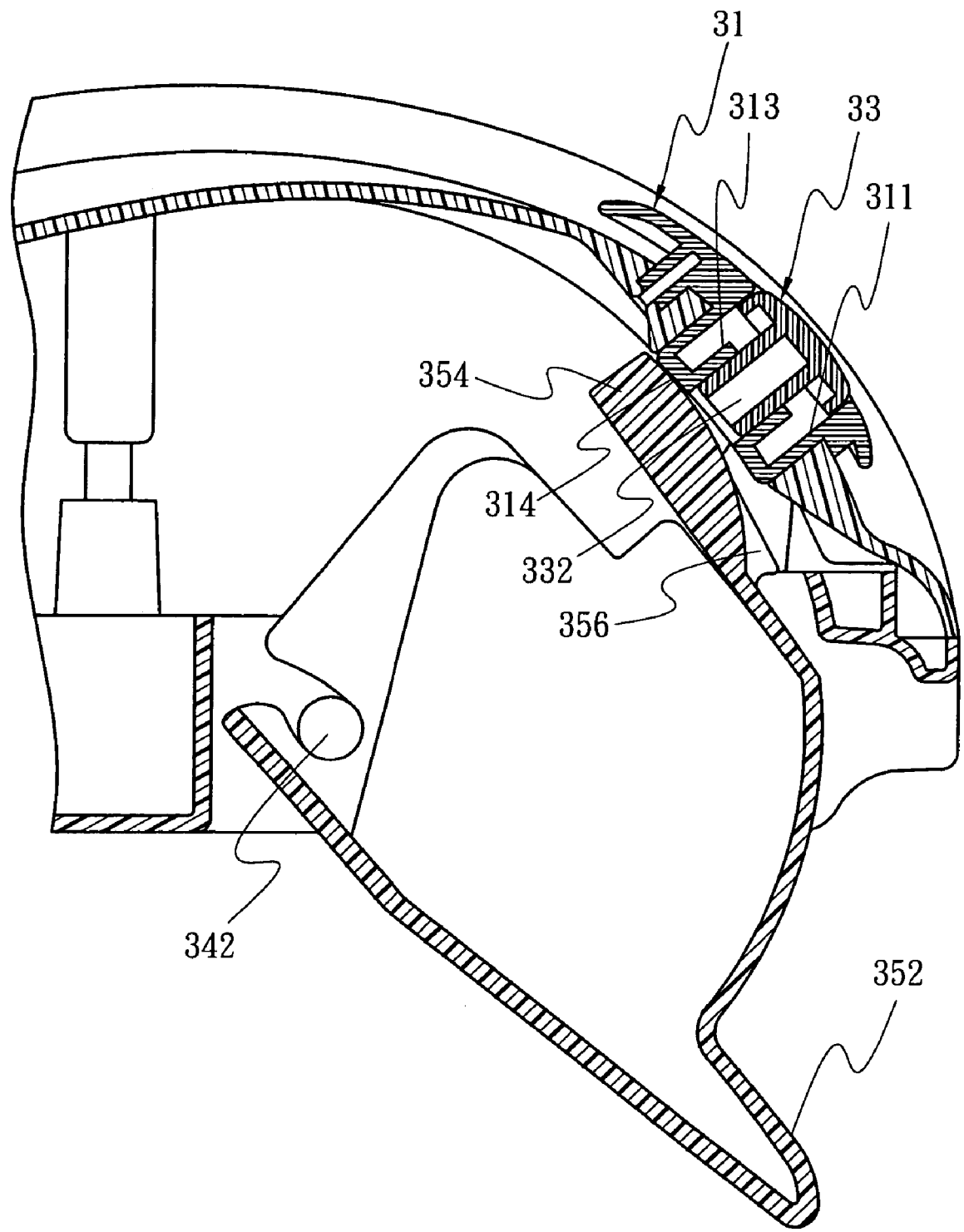
Figure 18B:
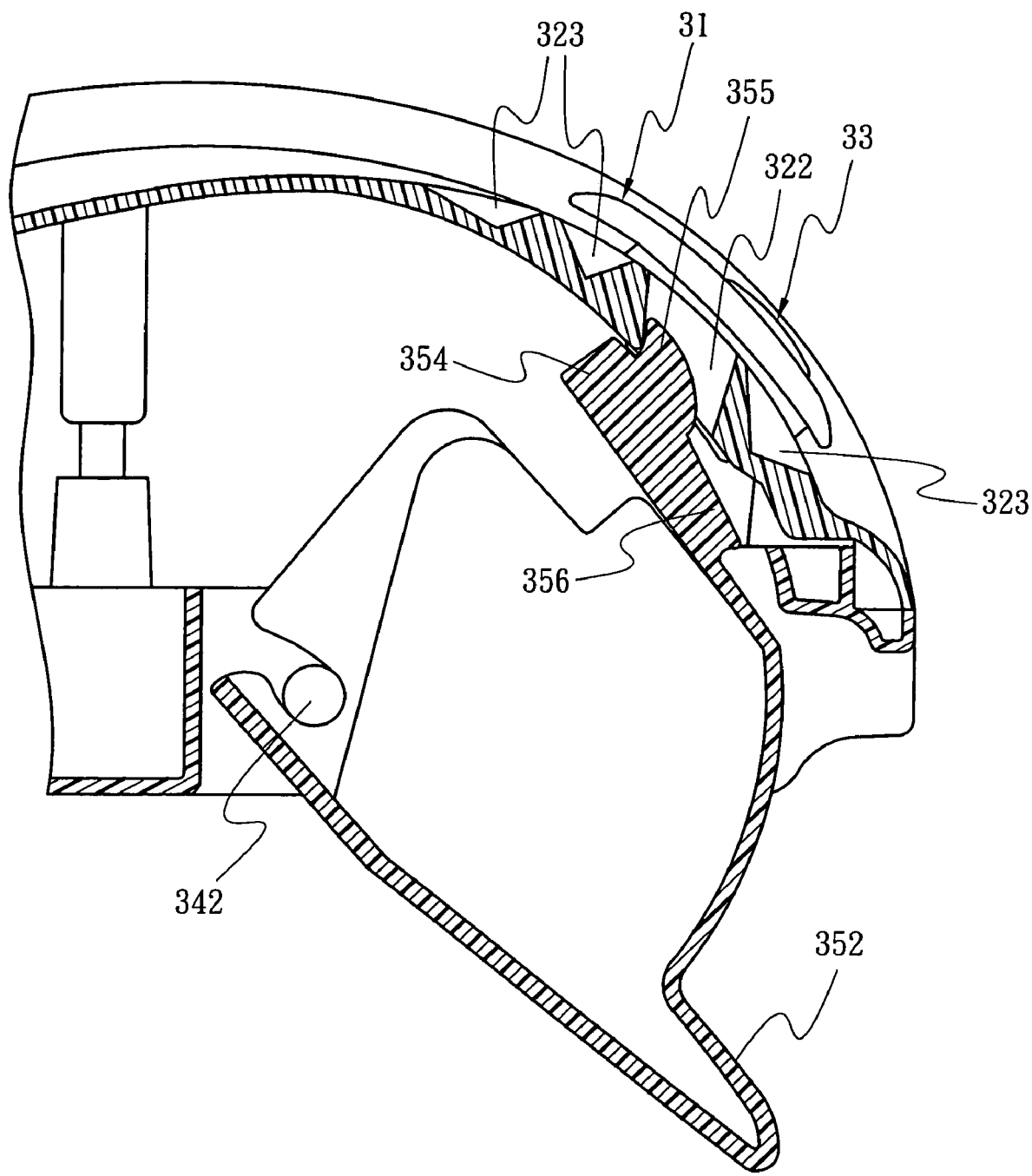
Figure 19A:
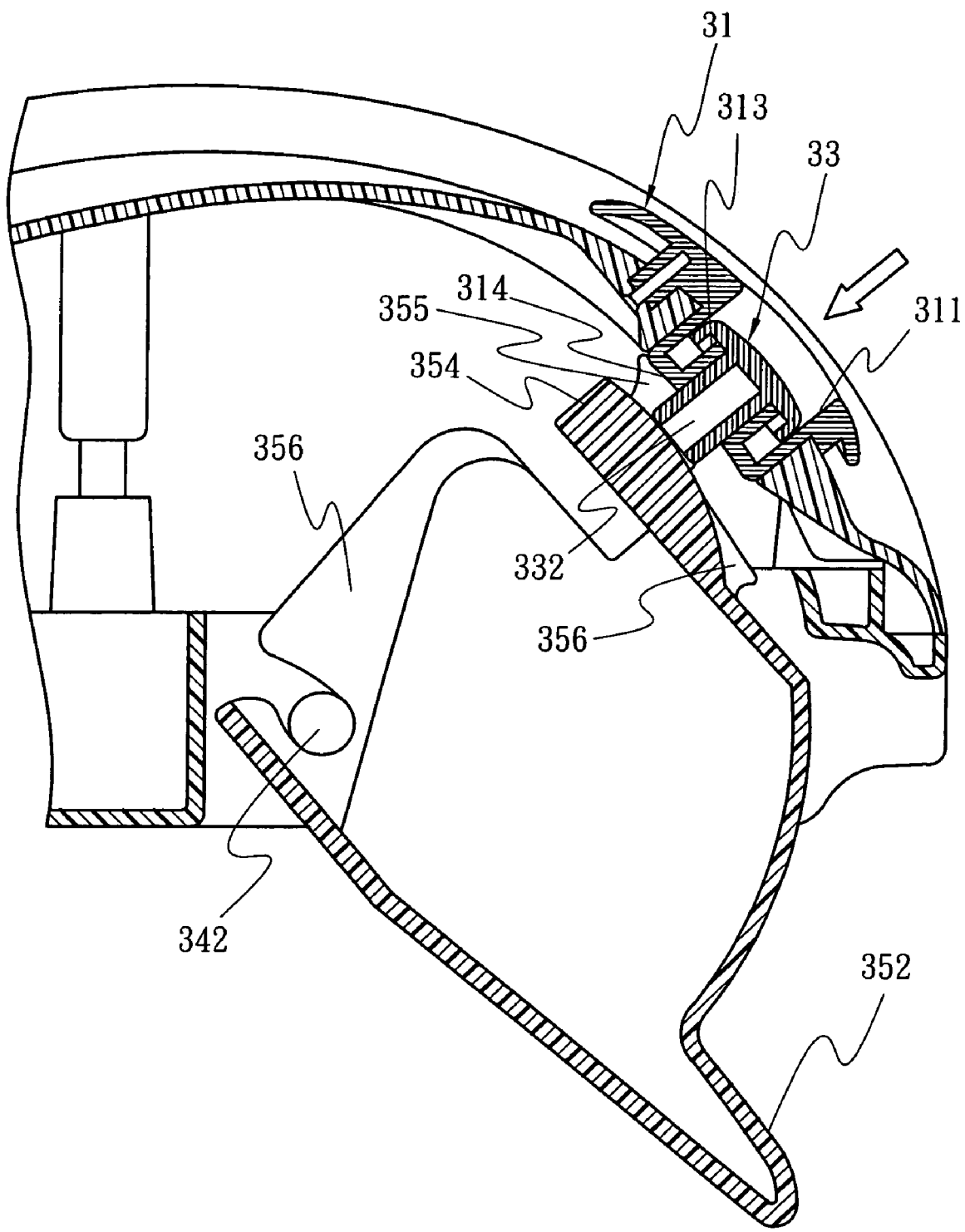
Figure 19B:
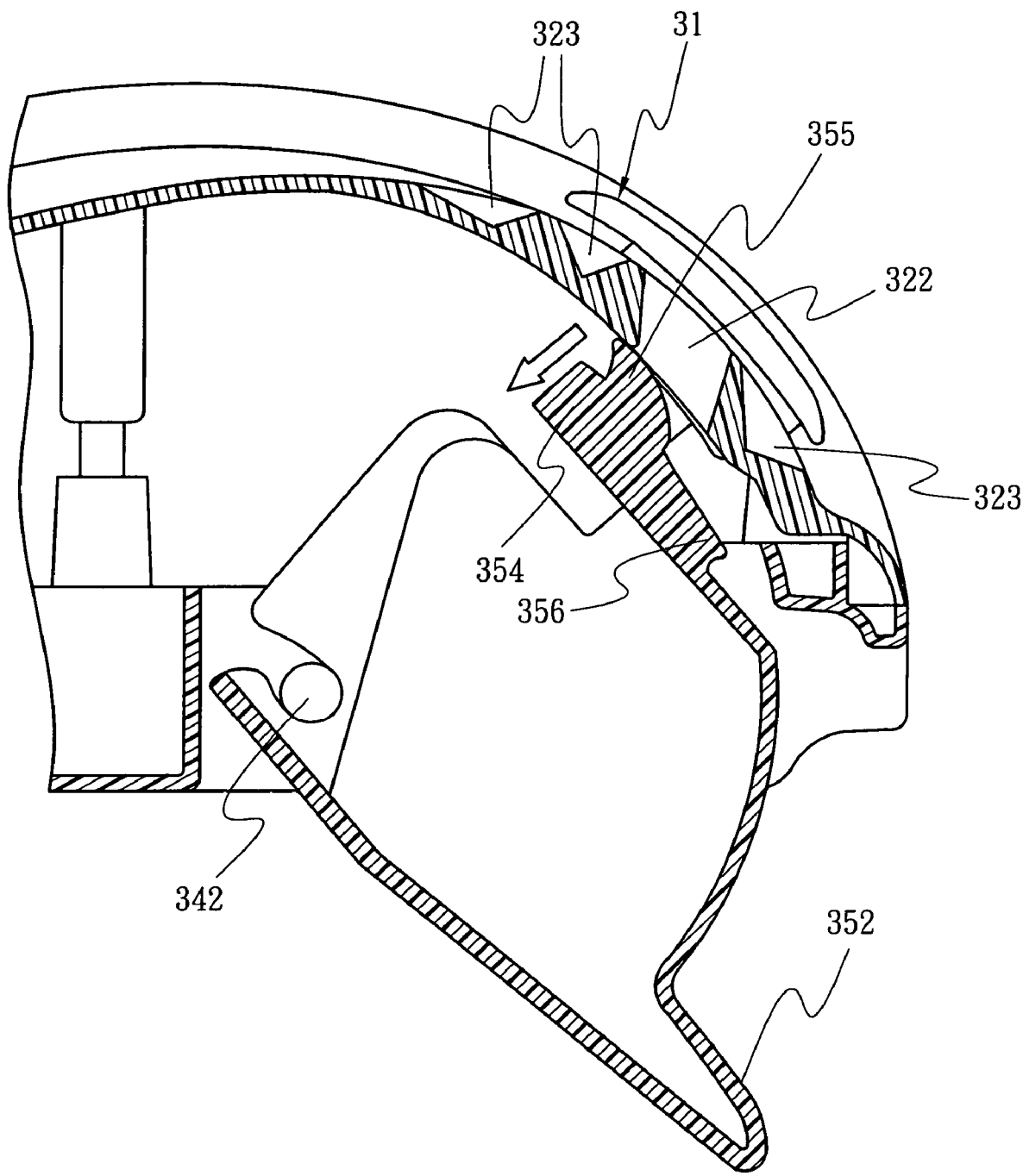

When a user intends to adjust the tilt adjustment mechanism 3 of the child safety seat, pull at the support block 35 by hands to let the support block 35 pivotally rotates with respect to the seat portion 36, such that each of the engaging wedges 355 of the plate-like portion 354 in the support block 35 is engaged with the through grooves 322 of the seat portion 36, and thus the support block would not continue to move downwardly and would be positioned at this situation by engagement of them, and the engaging wedges 355 are hook-shaped that are enable to prevent from sliding. FIGS. 18A and 6B are the side views of the tilt adjustment mechanism 3 after adjusting, and the bottom of the support block 35 is at an angle with respect to the bottom surface of the lower-seat portion 34 at this time, which is shown in FIGS. 18A and 18B, and the button-cover bottom 314 of the button cover 31 is above the middle position of the plate-like portion 354 (shown in FIG. 18A).

On the other hand, when a user intends to restore the tilt adjustment mechanism 3, press the button 33 to let the column portion 332 of the button 33 be pressed against the plate-like portion 354 to move the plate-like portion 342 downwardly such that the plate-like portion 354 is deformed as a result of resilience and the engaging wedges 355 is disengaged from the through grooves 322; and then pull at the support block 35 upwardly such that the support block would pivotally rotate and restore the former original position accordingly and the restoring thereof and the adjusting of the tilt adjustment mechanism 3 could be achieved. Additionally, the bottom of the support block 35 is parallel to the bottom surface of the lower-seat portion 34.

According to the above-mentioned, a tilt adjustment mechanism 3 according to the embodiment is provided, which is utilized to adjust angle of the child safety seat by using the pivotal rotation between the support block 35 and the seat portion 36 and to position it by engaging the through grooves 322 of the seat portion 36 with the engaging wedges 355 of the support block 35; and besides, the engaging wedges 355 may escape from the through grooves 322 by actuating the button 33 to press against the plate-like portion 354, thus the operation method of the tilt adjustment mechanism 3 and its structure are indeed different with the related prior arts and the improved tilt adjustment mechanism 3 could indeed achieve the purposes and the features of the present invention.

The above-described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

What is claimed is:

1. A tilt adjustment mechanism mounted on a child safety seat, said tilt adjustment mechanism comprising:
   a seat portion having a recessed portion;
   a support block pivotally connected to said seat portion having a first protruding portion, said support block being rotated relative to said seat portion between a first position at which said recessed portion of said seat portion is engaged with said first protruding portion of said supporting block and a second position at which said recessed portion of said seat portion is disengaged from said first protruding portion of said supporting block for varying an angle between said seat portion and said support block; and
   a button to be disposed within said recessed portion and abutted against said first protruding portion while said support block is in said first position.

2. The tilt adjustment mechanism according to claim 1, wherein said support block includes a plate-like portion that is elastic, and said first protruding portion is formed on said plate-like portion, said button is pressed against said first protruding portion while said support block is in said first position to remove said first protruding portion of said supporting block from said recessed portion of said seat portion so as to rotate said support block to said second position.

3. The tilt adjustment mechanism according to claim 1, wherein said button includes a column portion to be contacted with said first protruding portion when said support block is in said first position.

4. The tilt adjustment mechanism according to claim 1, wherein said support block includes a flange in a front end thereof to prevent said support block from fully entering inside said seat portion and facilitate a user to pull at said support block.

5. The tilt adjustment mechanism according to claim 1, wherein said protruding portion of said support block is hook-shaped.

6. A tilt adjustment mechanism mounted on a child safety seat, said tilt adjustment mechanism comprising:
   a seat portion having a recessed portion; and
   a support block pivotally connected to said seat portion having a first protruding portion, said support block being rotated relative to said seat portion between a first position at which said recessed portion of said seat portion is engaged with said first protruding portion of said supporting block and a second position at which said recessed portion of said seat portion is disengaged from said first protruding portion of said supporting block for varying an angle between said seat portion and said support block,
   wherein said support block includes a plate-like portion that is elastic, and said first protruding portion is formed on said plate-like portion.

7. The tilt adjustment mechanism according to claim 6, wherein said support block is in a form of sector section from a cross-sectional view and includes a top portion and a bottom portion, and one end of said plate-like portion is integrally connected to said top portion and two sides and another end of said plate-like portion are separated from said top portion.

8. The tilt adjustment mechanism according to claim 7, wherein said support block includes a wall portion integrally connected between said top portion and said bottom portion, said wall portion having a first wall and a second wall substantially parallel to said first wall, said first wall and second wall including a nib respectively for interfering with said seat portion when said support block is in said second position.

9. The tilt adjustment mechanism according to claim 6, further comprising a button mounted on said seat portion, and said button includes a column portion to pass through a hole of said seat portion so as to press against said plate-like portion while said support block is in said first position so that said first protruding of said support block removing from said recessed portion of said seat portion and said support block capable rotate to said second position.

10. The tilt adjustment mechanism according to claim 6, wherein said support block further has a second protruding portion, and said recessed portion of said seat portion is selectively engaged with one of said first protruding portion and said second protruding portion so as to lock said support block respectively at said first position and said second position.

11. A tilt adjustment mechanism mounted on a child safety seat, said tilt adjustment mechanism comprising:
    a seat portion having a recessed portion; and
    a support block pivotally connected to said seat portion having a first protruding portion, said support block being rotated relative to said seat portion between a first position at which said recessed portion of said seat portion is engaged with said first protruding portion of said supporting block and a second position at which said recessed portion of said seat portion is disengaged from said first protruding portion of said supporting block for varying an angle between said seat portion and said support block,
    wherein said seat portion includes an upper-seat portion and a lower-seat portion fastened under said upper-seat portion, and said support block is pivotally connected to said lower-seat portion and said recessed portion is disposed on said upper-seat portion.

12. A child safety seat comprising:
    a seat portion having a coupling portion;

a support block pivotally connected to said seat portion having a first engaging portion, the first engaging portion being selectively engaged with the coupling portion of the seat so as to vary an angle between said seat portion and said support block; and a button mounted on the seat portion, the button being operative to disengage the first engaging portion from the coupling portion, wherein the support block includes an elastic portion and the first engaging portion is formed thereon.

13. The child safety seat according to claim 12, wherein the coupling portion is a recessed portion and the first engaging portion protrudes from the support block.

14. The child safety seat according to claim 12, wherein said support block is in a form of sector section from a cross-sectional view and includes a top portion and a bottom portion, a plate-like portion is integrally connected to the top portion, and two sides and an end portion of said plate-like portion are separated from said top portion to form the elastic portion.

15. A child safety seat comprising:

a seat portion having a coupling portion a support block pivotally connected to said seat portion having a first engaging portion, the first engaging portion being selectively engaged with the coupling portion of the seat so as to vary an angle between said seat portion and said support block; and wherein the support block includes an elastic portion and the first engaging portion is formed thereon, and wherein said seat portion includes an upper-seat portion and a lower-seat portion fastened under said upper-seat portion, and said support block is pivotally connected to said lower-seat portion and the first engaging portion is disposed on said upper-seat portion.

16. The child safety seat according to claim 15, wherein the coupling portion is a recessed portion and the first engaging portion protrudes from the support block.

* * * * *